(12) United States Patent
Taira et al.

(10) Patent No.: US 10,819,078 B2
(45) Date of Patent: Oct. 27, 2020

(54) METHOD FOR MANUFACTURING OPTICAL ELEMENT AND OPTICAL ELEMENT

(71) Applicant: INTER-UNIVERSITY RESEARCH INSTITUTE CORPORATION NATIONAL INSTITUTES OF NATURAL SCIENCES, Mitaka-shi, Tokyo (JP)

(72) Inventors: Takunori Taira, Okazaki (JP); Arvydas Kausas, Okazaki (JP)

(*) Notice: Subject to any disclaimer, the term of this patent is extended or adjusted under 35 U.S.C. 154(b) by 50 days.

(21) Appl. No.: 16/255,832

(22) Filed: Jan. 24, 2019

(65) Prior Publication Data

US 2019/0229486 A1   Jul. 25, 2019

(30) Foreign Application Priority Data

Jan. 25, 2018  (JP) ................................ 2018-010560

(51) Int. Cl.
   *H01S 3/04*   (2006.01)
   *H01S 3/00*   (2006.01)
   (Continued)

(52) U.S. Cl.
   CPC ........ *H01S 3/0401* (2013.01); *B29D 11/0074* (2013.01); *B29D 11/00865* (2013.01);
   (Continued)

(58) Field of Classification Search
   CPC ...... H01S 3/0401; H01S 3/0085; H01S 3/042; H01S 3/0627; H01S 3/07; H01S 3/0405;
   (Continued)

(56) References Cited

U.S. PATENT DOCUMENTS

2003/0063638 A1   4/2003   Hasson
2006/0114951 A1   6/2006   Chou et al.
(Continued)

FOREIGN PATENT DOCUMENTS

JP   S62-185339   8/1987
JP   H9-298333    11/1997
(Continued)

OTHER PUBLICATIONS

Hiromasa Ichikawa, et al., "High-power and highly efficient composite laser with an anti-reflection coated layer between a laser crystal and a diamond heat spreader fabricated by room-temperature bonding", Optics Express, Sep. 11, 2017, No. 19, P22797-P22804, vol. 25.

(Continued)

*Primary Examiner* — Armando Rodriguez
(74) *Attorney, Agent, or Firm* — Soei Patent & Law Firm

(57) ABSTRACT

A method for manufacturing an optical element includes a bonding step of bonding a first and a second element portion to each other without interposing an adhesive therebetween. The bonding step includes: a first step of fixing the first and the second element portion with an intermediate layer disposed between these portion, the intermediate layer containing an element substitutable for a constituent element of a bonded portion in the first and the second element portion, the intermediate layer being colored; and a second step of integrating a part of the intermediate layer with the first and the second element portion, and making a part of the intermediate layer transparent to laser light by irradiating the intermediate layer with giant pulse laser light and causing it to be absorbed into the intermediate layer after the first step.

20 Claims, 19 Drawing Sheets

(51) Int. Cl.
*H01S 3/07* (2006.01)
*H01S 3/042* (2006.01)
*H01S 3/06* (2006.01)
*H01S 3/08* (2006.01)
*H01S 3/113* (2006.01)
*B29D 11/00* (2006.01)

(52) U.S. Cl.
CPC ............ *H01S 3/0085* (2013.01); *H01S 3/042* (2013.01); *H01S 3/0627* (2013.01); *H01S 3/07* (2013.01); *H01S 3/0405* (2013.01); *H01S 3/0604* (2013.01); *H01S 3/0612* (2013.01); *H01S 3/0621* (2013.01); *H01S 3/0623* (2013.01); *H01S 3/0805* (2013.01); *H01S 3/113* (2013.01)

(58) Field of Classification Search
CPC .... H01S 3/0604; H01S 3/0612; H01S 3/0621; H01S 3/0623; H01S 3/0805; H01S 3/113; B29D 11/0074; B29D 11/00865
See application file for complete search history.

(56) References Cited

U.S. PATENT DOCUMENTS

2007/0183467 A1  8/2007  Ketteridge
2010/0304151 A1  12/2010  Tuennermann et al.
2013/0344302 A1  12/2013  Helie

FOREIGN PATENT DOCUMENTS

| | | |
|---|---|---|
| JP | 2000-101175 | 4/2000 |
| JP | 2003-170290 | 6/2003 |
| JP | 2008-258627 | 10/2008 |
| JP | 2010-519746 | 6/2010 |
| JP | 2014-135421 | 7/2014 |
| JP | 2016-018071 | 2/2016 |
| JP | 2016-082122 | 5/2016 |
| JP | 6245587 | 11/2017 |
| JP | 2017-220652 | 12/2017 |
| WO | 2008/035770 | 3/2008 |

OTHER PUBLICATIONS

Arvydas Kausas, "Structured laser gain-medium by new bonding for power micro-laser", Proceedings of SPIE, Feb. 17, 2017, P100820Z-1-P100820Z-4, vol. 10082.

Tomo Katsumata et al, "Highly Efficient and High-power Operation of a Room-temperature-bonded Nd:YAG/diamond Composite Laser with an Anti-reflection Coating Layer at the Bonded Interface", The 64th Spring Academic Lecture Meeting of Japan Soc. of Applied Physics, Mar. 2017, 15p-213-8.

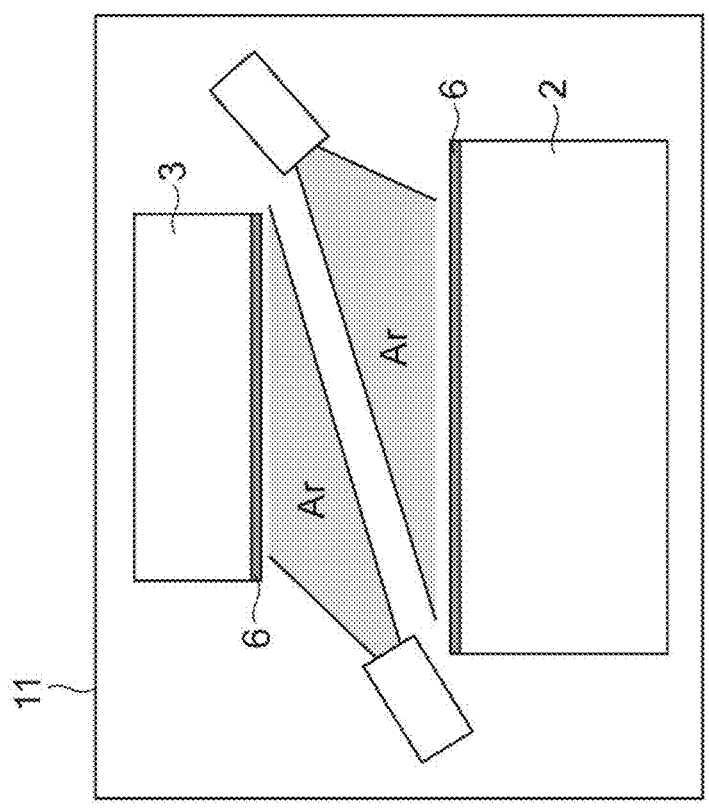
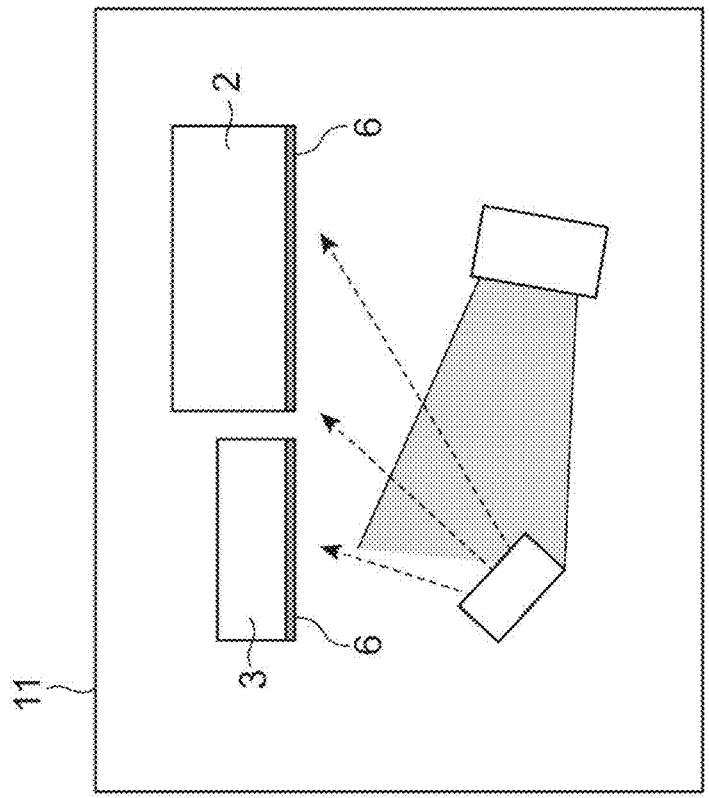

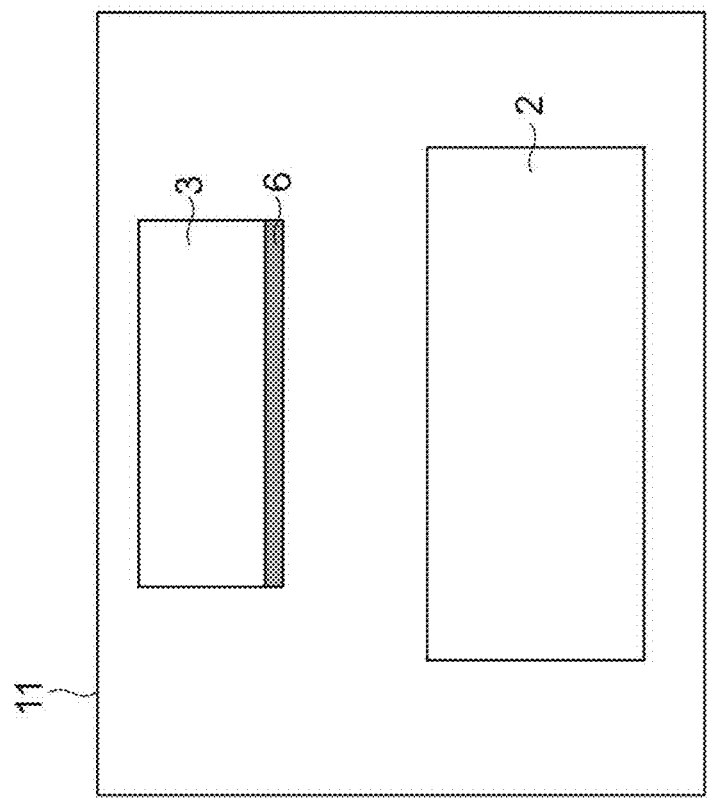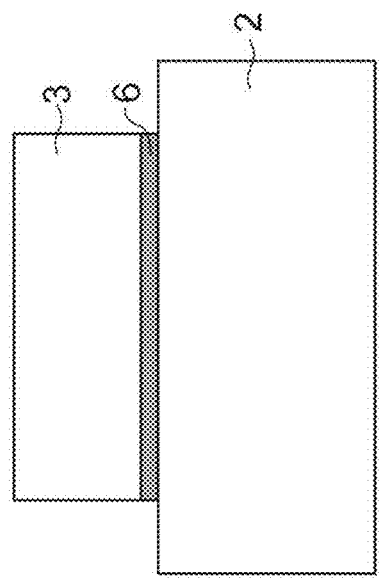

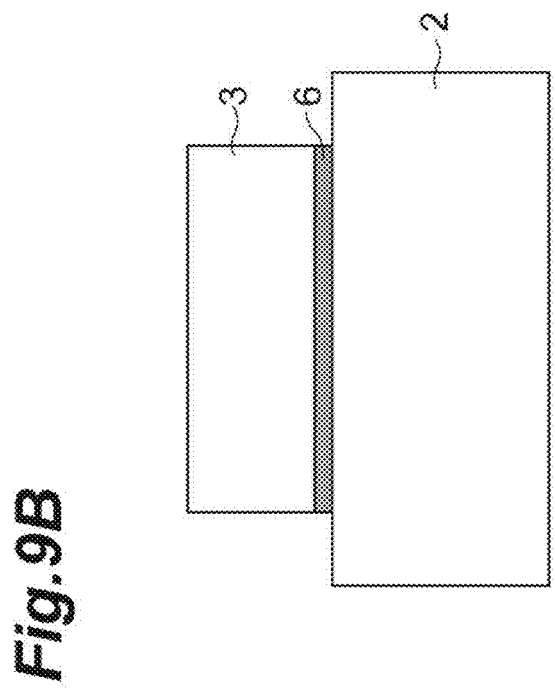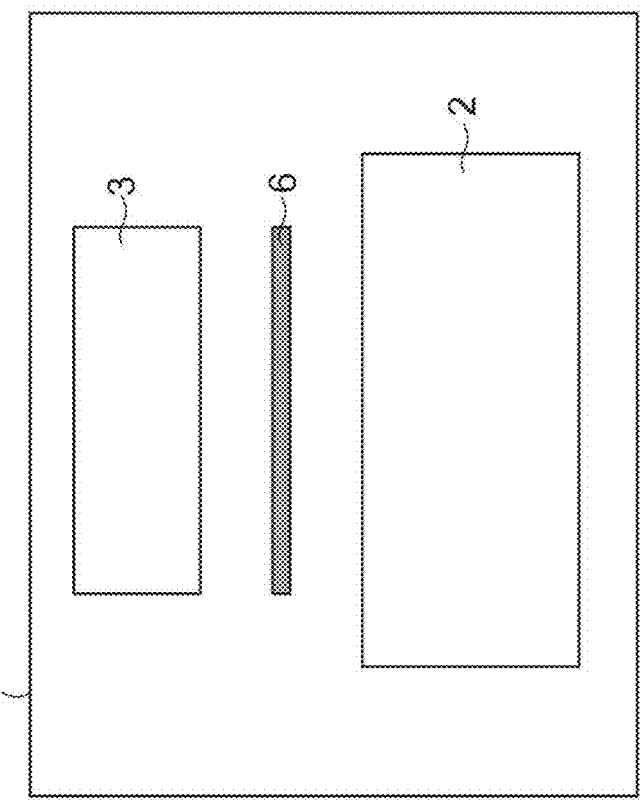

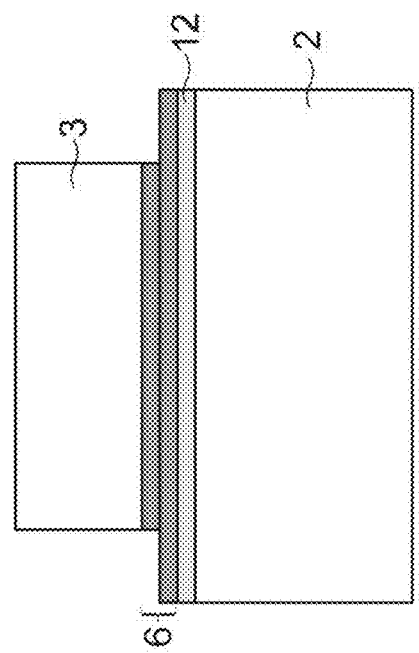
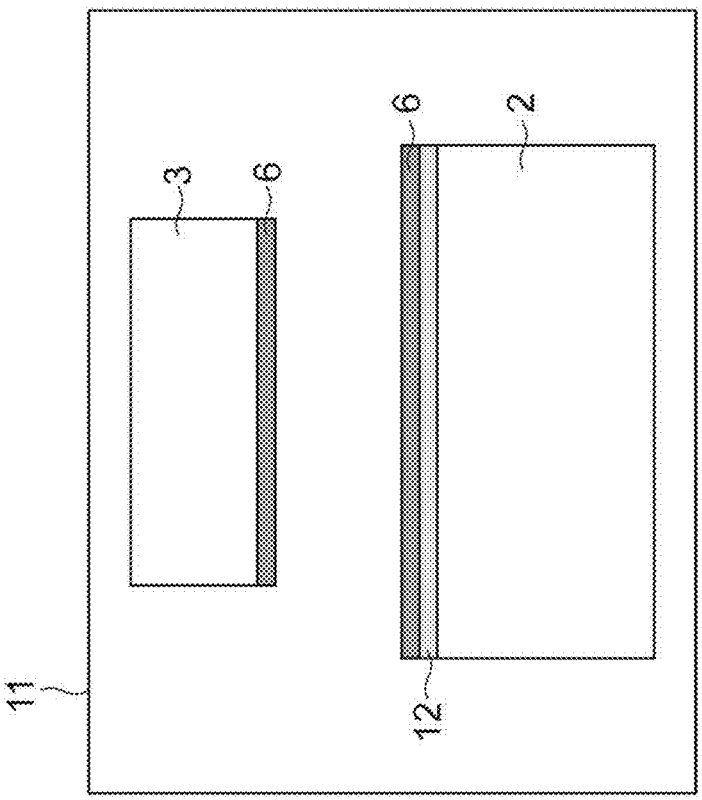

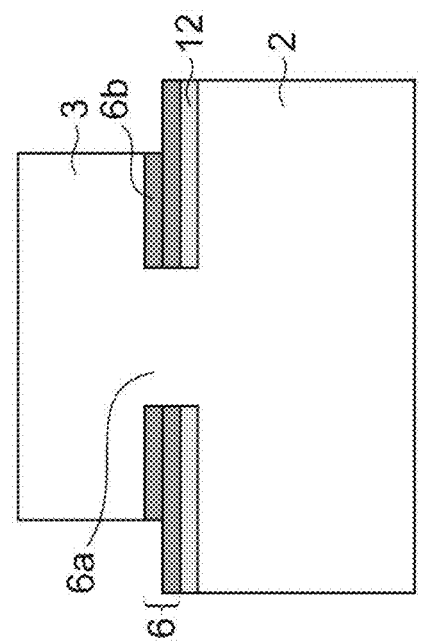
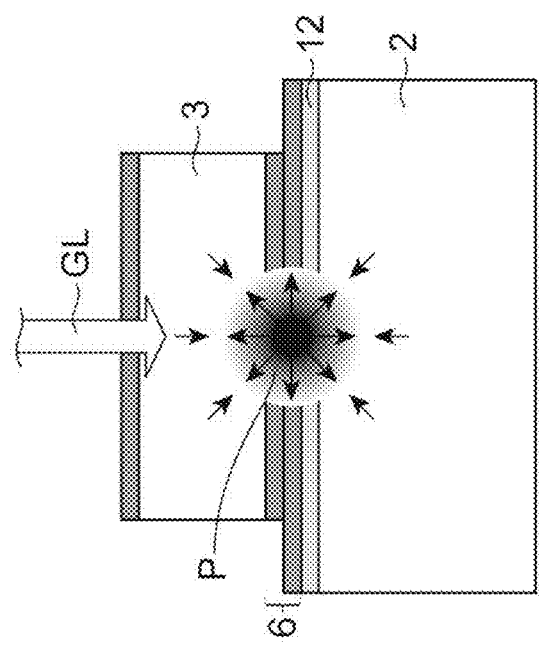
Fig.11A
Fig.11B

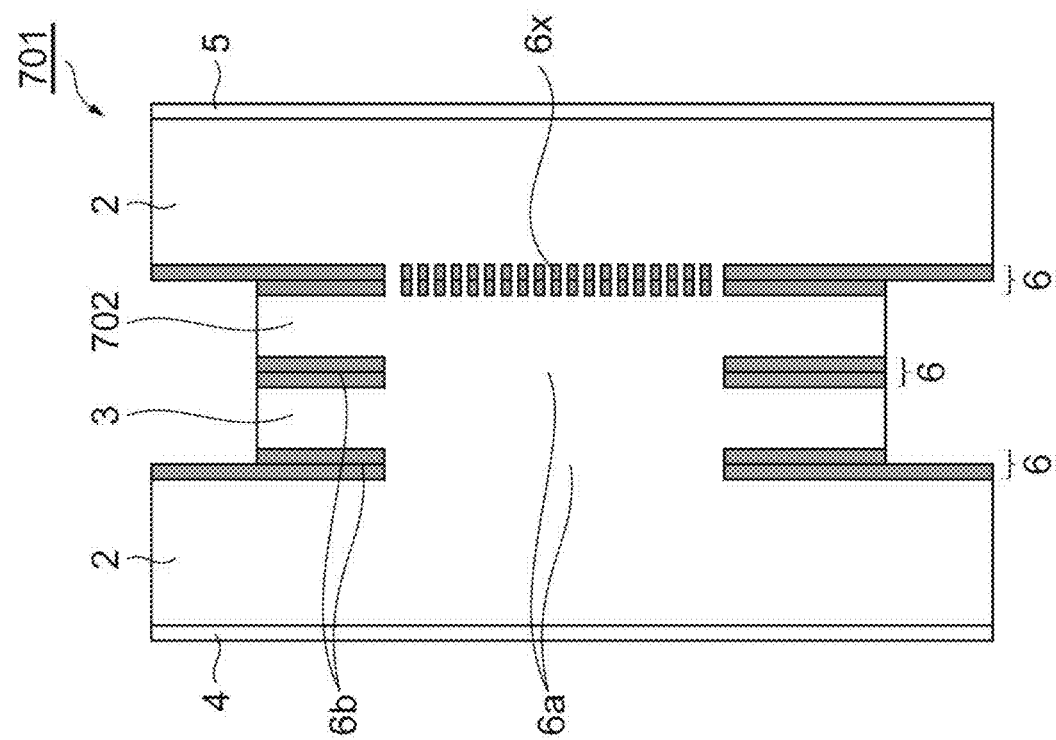
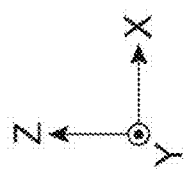

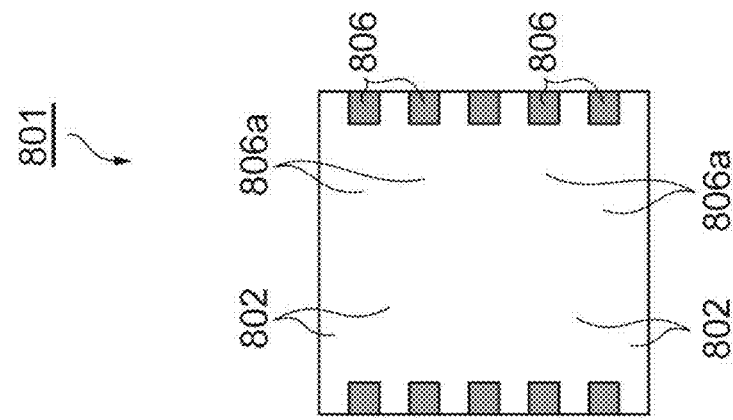

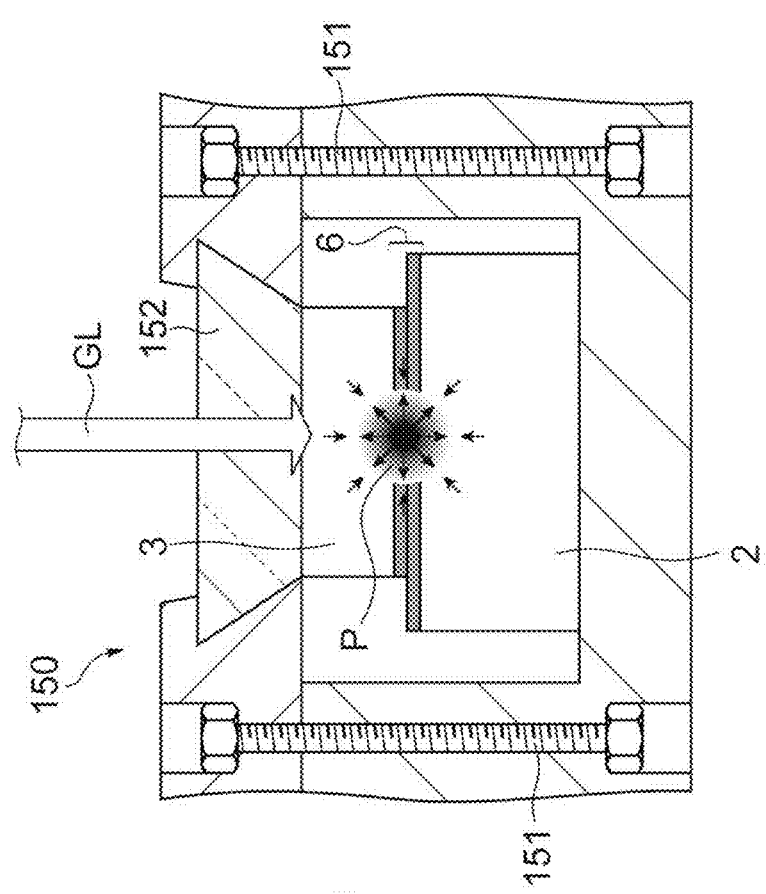
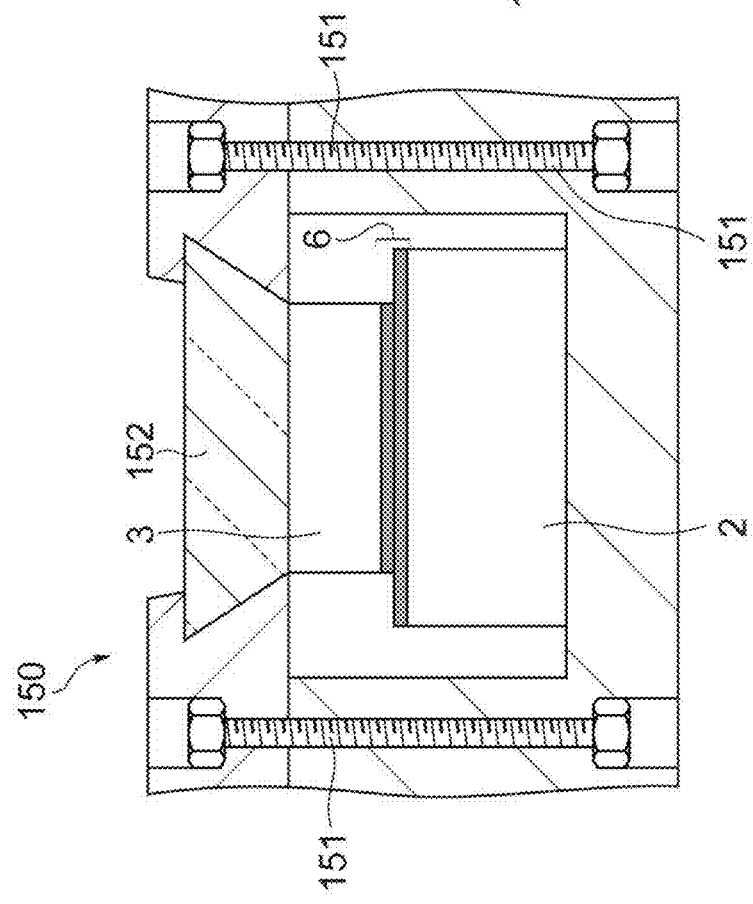

METHOD FOR MANUFACTURING OPTICAL ELEMENT AND OPTICAL ELEMENT

CROSS-REFERENCE TO RELATED APPLICATION

This application claims the benefit of priority from Japanese Patent Application No. 2018-010560, filed Jan. 25, 2018, the entire contents of which are incorporated herein by reference.

BACKGROUND

1. Technical Field

A method for manufacturing an optical element through which laser light is transmitted or reciprocated, and the optical element.

2. Description of the Related Art

As a method for manufacturing an optical element, a method including a step of bonding a first element portion and a second element portion, which are transparent to emitted laser light, to each other without interposing an adhesive therebetween is known. As a technique of this type, for example, a laser element obtained by bonding diamond (second element portion) to Nd:YAG (first element portion) at normal temperature is disclosed in Katsumata, Ichikawa and Shoji, "High-Efficiency and High-Power Operation of Normal-Temperature-Bonded Nd:YAG/Diamond Composite Laser with Nonreflective Coating at Interface", The 64th Spring Academic Lecture Meeting of Japan Soc. of Applied Physics, 15p-213-8, 2017.3.

The above-described technique is capable of providing a small and simple configuration, but has the problem that it is not easy to bond the elements, and mass production is difficult.

SUMMARY

In manufacturing an optical element, an intermediate layer of silicon, a metal or the like may be interposed between the first element portion and the second element portion for increasing the bonding area and enhancing the bonding strength between the first element portion and the second element portion. However, in this case, there arises another problem that existence of the intermediate layer increases loss of emitted laser light. Thus, an object of one or more example embodiments of the present disclosure is to provide a method for manufacturing an optical element capable of reducing loss of emitted laser light while providing a small and simple configuration, and the optical element.

A method for manufacturing an optical element according to one or more examples is a method for manufacturing an optical element through which laser light is transmitted or reciprocated, the method including a bonding step of bonding a first element portion and a second element portion, which are transparent to laser light, to each other without interposing an adhesive therebetween. The bonding step may include a first step of fixing the first element portion and the second element portion with an intermediate layer disposed between the first element portion and the second element portion, the intermediate layer containing an element substitutable for a constituent element of a bonded portion in at least one of the first element portion and the second element portion, the intermediate layer being colored. Additionally, the bonding step may include a second step of integrating at least a part of the intermediate layer with at least one of the first element portion and the second element portion, making at least a part of the intermediate layer transparent to laser light by irradiating the intermediate layer with giant pulse laser light, and causing the giant pulse laser light to be absorbed into the intermediate layer after the first step.

In one or more example methods for manufacturing an optical element, the first element portion and the second element portion are bonded to each other without interposing an adhesive therebetween, and an intermediate layer is interposed between these element portions. By interposing the intermediate layer, the bonding area between the first element portion and the second element portion can be increased to enhance the bonding strength, and these elements can be firmly bonded to each other to provide a small and simple laser element configuration. In addition, since at least a part of the intermediate layer is integrated with at least one of the first element portion and the second element portion, and made transparent to laser light, an increase in loss of laser light due to the existence of the intermediate layer can be suppressed to reduce the loss of emitted laser light while providing a small and simple configuration.

In one or more examples of manufacturing an optical element, in the first step, the first element portion and the second element portion are bonded to each other at room temperature via the intermediate layer. Here, the first element portion and the second element portion can be bonded and fixed with high bonding strength.

In one or more examples of manufacturing an optical element, in the first step, the first element portion and the second element portion are fixed using a fixing tool with the intermediate layer disposed between the first element portion and the second element. Here, the first element portion and the second element portion can be fixed using a fixing tool such as an anvil.

In one or more examples of manufacturing an optical element, the first element portion may include diamond, silicon carbide, sapphire, garnet containing YAG, a single crystal of sesquioxide, a ceramic, glass, organic materials, or any combination thereof. The second element portion may include garnet containing YAG, a single crystal of sesquioxide, a ceramic, glass, organic materials, or an optical material including a laser gain medium containing sapphire, or any combination thereof. In the first step, at least one of silicon, aluminum, scandium, lutetium, gadolinium or carbon, which is substitutable for the constituent elements of the first element portion and the second element portion, may be disposed between the first element portion and the second element portion. Here, giant pulse laser light can be applied to and absorbed into the intermediate layer to constitute at least a part of the intermediate layer by a stable compound. The substances of the first element portion and the second element portion are not limited to the above-mentioned substances, and various substances can be used. YAG includes YAG ($3Y_2O_3$-$5Al_2O_3$) to which a luminescent center is added. Similarly, in other media, Nd or Yb that is a rare earth (RE), or Ti or Cr that is a transition metal (TM) is mainly used as a luminescent center. The luminescent center is added, or is not added depending on a purpose.

In one or more examples of manufacturing an optical element, in the first step, the intermediate layer is formed on at least one of the first element portion and the second element portion by sputtering or vapor deposition. Here, a configuration in which the intermediate layer is disposed between the first element portion and the second element portion can be practically provided by sputtering or vapor deposition.

In one or more examples of manufacturing an optical element, in the first step, an intermediate layer having a sheet shape is sandwiched between the first element portion and the second element portion. Here, a configuration in which the intermediate layer is disposed between the first element portion and the second element portion can be practically provided by forming the intermediate layer into a sheet shape.

In one or more examples of manufacturing an optical element, a bonded portion in at least one of the first element portion and the second element portion is provided with a coating layer, and in the second step, at least a part of the intermediate layer is integrated with the coating layer. Here, at least a part of the intermediate layer can be integrated using the coating layer.

In one or more examples of manufacturing an optical element, in the second step, a fine pattern including a colored portion and a transparent portion is formed in the intermediate layer by performing application of giant pulse laser light in such a manner that a light wave interferes in the intermediate layer, by performing formation of nanostructures by application of an ultra-short pulse, or by performing patterning of giant pulse laser light by direct rendering or scanning. Here, emitted laser light can be modulated using the fine pattern.

In one or more examples of manufacturing an optical element, in the second step, a part of the intermediate layer is made transparent, and another part of the intermediate layer remains colored. In some examples, a giant pulse laser light may not need to be absorbed to make the intermediate layer transparent over the entire region of the intermediate layer, and thus production can be simplified. In addition, such an intermediate layer can also be used as an aperture.

In one or more examples of manufacturing an optical element, the first element portion forms a heat sink, the second element portion forms an optical material including laser medium, and in the first step, a plurality of first element portions and second element portions are disposed in such a manner that the first element portions and the second element portions are alternately arranged. In some examples, a high-power small integrated laser apparatus may be provided with a DFC (distributed face cooling) structure.

In one or more examples of manufacturing an optical element, a fine pattern including a colored portion and a transparent portion is formed in the intermediate layer by performing application of a giant pulse laser light in such a manner that a light wave interferes in the intermediate layer, by performing formation of nanostructures by application of an ultra-short pulse, or by performing patterning of giant pulse laser light by direct rendering or scanning before the first step. In some examples, the first element portion and the second element portion are bonded to each other at normal temperature via the intermediate layer in the first step, and a portion including the colored portion of the fine pattern in the intermediate layer is made transparent in the second step. In examples in which the first element portion and the second element portion are bonded to each other at normal temperature, the bonding strength at which the colored portion of the fine pattern of the intermediate layer is interposed between the elements than the bonding strength at which the transparent portion of the fine pattern of the intermediate layer is interposed between the elements. That is, in a bonded region between the first element portion and the second element portion via the transparent intermediate layer, the bonding strength of a portion along the fine pattern is different from the bonding strength of the other portions. Accordingly, even though the intermediate layer is ultimately transparent, the transmittance between the first element portion and the second element portion varies depending on the fine pattern due to such a difference in bonding strength. Therefore, emitted laser light can be modulated using the fine pattern. The polarization of emitted laser light can be controlled. An optical function can be imparted.

An optical element according to one or more examples may comprise an optical element through which laser light is transmitted or reciprocated. The optical element may include a first element portion transparent to laser light, and a second element portion bonded to the first element portion without interposing an adhesive therebetween. An intermediate layer is interposed between the first element portion and the second element portion, and at least a part of the intermediate layer is integrated with at least one of the first element portion and the second element portion, and is transparent to laser light. At least a part of the intermediate layer is integrated with at least one of the first element portion and the second element portion and is transparent to laser light. In some examples, the part of the intermediate layer may comprise a portion that forms a mixed crystal with a constituent element, or a portion where substitution of an element occurs, in at least one of the first element portion and the second element portion.

In one or more example optical elements, the first element portion and the second element portion are bonded to each other without interposing an adhesive therebetween, and an intermediate layer is interposed between these element portions. By interposing the intermediate layer, the bonding area between the first element portion and the second element portion can be increased to enhance the bonding strength, and these elements can be firmly bonded to each other to provide a small and simple laser element configuration. In addition, since at least a part of the intermediate layer is integrated with at least one of the first element portion and the second element portion, and made transparent to laser light, an increase in loss of laser light due to existence of the intermediate layer can be suppressed to reduce loss of emitted laser light while providing a small and simple configuration.

In one or more example optical elements, in a bonded portion in at least one of the first element portion and the second element portion is provided with a coating layer, at least a part of the intermediate layer is integrated with the coating layer. Here, at least a part of the intermediate layer can be integrated using the coating layer.

In one or more example optical elements, the first element portion forms a heat sink, the second element portion forms an optical material including laser medium, and a plurality of first element portions and second element portions are disposed in such a manner that the first element portions and the second element portions are alternately arranged to provide a high-power small integrated laser apparatus with a DFC structure.

In one or more examples optical elements through which laser light is transmitted or reciprocated, the optical element may include a first element portion transparent to laser light, and a second element portion bonded to the first element portion without interposing an adhesive therebetween. An intermediate layer is interposed between the first element portion and the second element portion, and at least a part of the intermediate layer is integrated with at least one of the first element portion and the second element portion, and is transparent to laser light. Additionally, the optical element may include a bonded portion in at least one of the first element portion and the second element portion is provided with a coating layer, at least a part of the intermediate layer is integrated with the coating layer.

In one or more example optical elements, the first element portion and the second element portion are bonded to each other without interposing an adhesive therebetween, and an intermediate layer is interposed between these element portions. By interposing the intermediate layer, the bonding area between the first element portion and the second element portion can be increased to enhance the bonding strength, and these elements can be firmly bonded to each other to provide a small and simple laser element configuration. In addition, since at least a part of the intermediate layer is integrated with at least one of the first element portion and the second element portion, and made transparent to laser light, an increase in loss of laser light due to existence of the intermediate layer can be suppressed to reduce loss of emitted laser light while providing a small and simple configuration. Further, integration of at least a part of the intermediate layer can be performed using the coating layer.

In one or more example optical elements, at least a part of the intermediate layer is at least one of a compound containing a constituent element of a bonded portion of the first element portion and a compound containing a constituent element of a bonded portion of the second element portion. Here, a configuration in which at least a part of the intermediate layer is integrated with at least one of the first element portion and the second element portion is practically provided.

The optical element may comprise a fine pattern including a colored portion and a transparent portion transparent to laser light is formed in the intermediate layer. Here, emitted laser light can be modulated using the fine pattern.

In one or more example optical elements, a part of the intermediate layer is transparent to laser light, and another part of the intermediate layer is colored. Such an intermediate layer can also be used as an aperture.

In one or more example optical elements, in a bonded region between the first element portion and the second element portion via the transparent intermediate layer, the bonding strength of a portion along a fine pattern is different from the bonding strength of other portions. Accordingly, even though the intermediate layer is transparent, the transmittance between the first element portion and the second element portion varies depending on the fine pattern due to such a difference in bonding strength. Therefore, emitted laser light can be modulated using the fine pattern. The polarization of emitted laser light can be controlled. An optical function can be imparted.

In one or more examples, an optical element, and a method of manufacturing the same, may be capable of reducing loss of emitted laser light while providing a small and simple configuration.

BRIEF DESCRIPTION OF DRAWINGS

FIG. 2A is a diagram illustrating a bonding step according to the first group of example embodiments;

FIG. 2B is a diagram illustrating the continuation of FIG. 2A;

FIG. 7A is a diagram illustrating a bonding step according to a second group of example embodiments;

FIG. 7B is a diagram illustrating the continuation of FIG. 7A;

FIG. 9A is a diagram illustrating a bonding step according to a third group of example embodiments;

FIG. 9B is a diagram illustrating the continuation of FIG. 9A;

FIG. 10A is a diagram illustrating a bonding step according to a fourth group of example embodiments;

FIG. 10B is a diagram illustrating the continuation of FIG. 10A;

FIG. 11A is a diagram illustrating the continuation of FIG. 10B;

FIG. 11B is a diagram illustrating the continuation of FIG. 11A;

FIG. 15 is a longitudinal sectional view showing a laser element according to a seventh group of example embodiments;

FIG. 16A is a diagram illustrating a method for manufacturing a nonlinear wavelength conversion element according to an eighth group of example embodiments;

FIG. 16B is a diagram illustrating the continuation of FIG. 16A;

FIG. 16C is a diagram illustrating the continuation of FIG. 16B;

FIG. 16D is a diagram illustrating the continuation of FIG. 16C;

FIG. 17A is a diagram illustrating a modified bonding step;

FIG. 17B is a diagram illustrating the continuation of FIG. 17A;

DESCRIPTION OF EMBODIMENTS

In the following description, with reference to the drawings, the same reference numbers are assigned to the same components or to similar components having the same function, and overlapping description is omitted.

First Group of Example Embodiments

Figure 1:
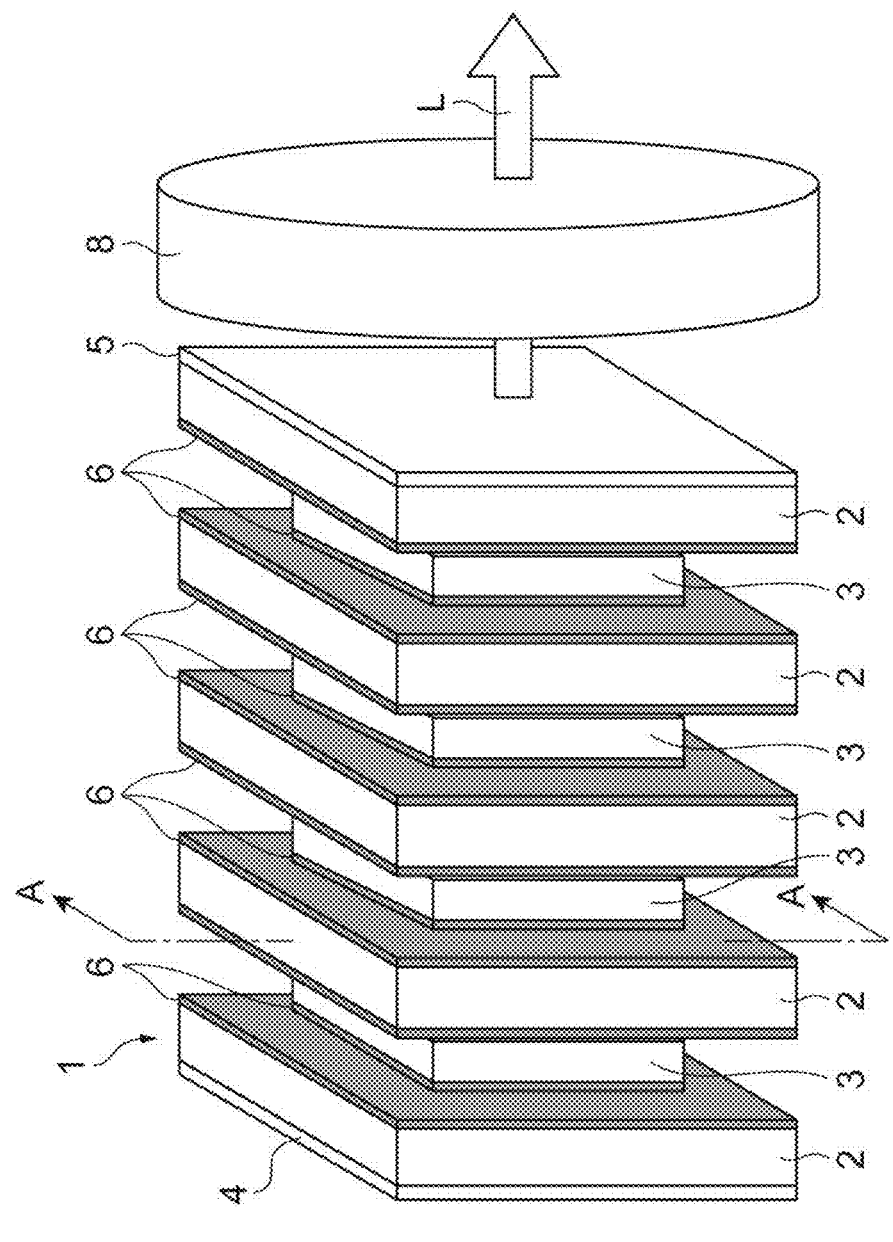
FIG. 1 is a schematic perspective view showing a small integrated laser apparatus including a laser element according to a first group of example embodiments.

FIG. 1 is a schematic perspective view showing a small integrated laser apparatus 100. The small integrated laser apparatus 100 shown in FIG. 1 is a laser light source that emits laser light L. The small integrated laser apparatus 100 is smaller and simpler and forms power laser with higher power as compared to fiber lasers and disc lasers. The small integrated laser apparatus 100 includes a laser element 1 according to a first group of example embodiments. In the following description, for the sake of convenience, an emission direction of laser light L is an "X direction", one direction orthogonal to the X direction is a "Y direction", and a direction orthogonal to the X direction and the Y direction is a "Z direction". The dimensional ratios in the drawings are not limited to the shown ratios.

First, the configuration of the laser element 1 will be described. The laser element 1 is an optical element having a DFC structure. The laser element 1 includes a plurality of heat sinks 2, a plurality of laser media 3, a first coating layer 4 and a second coating layer 5. The laser element 1 can form a high-power micro-laser. As one example, the laser element 1 is such that when as excitation light I, continuously oscillated diode light having a wavelength of 808 nm is input along the X direction from one end of the laser element 1 in the X direction (left side in the drawing), laser light L having a wavelength of 1064 nm is emitted from the other end of the laser element 1 in the X direction (right side in the drawing) through a Q switch element 8 including a saturable absorber. When the Q switch element 8 is not provided, the laser element 1 can also form a CW (continuous wave) laser.

The heat sink 2 and the laser medium 3 have a rectangular plate shape in which the X direction is a thickness direction. For example, the heat sink 2 has a flat plate shape with a thickness of 1 mm, a longitudinal dimension of 10 mm and a lateral dimension of 10 mm. For example, the laser medium 3 has a flat plate shape with a thickness of 1 mm, a longitudinal dimension of 8 mm and a lateral dimension of 8 mm. The heat sinks 2 and the laser media 3 are disposed so as to be alternately arranged in the X direction. That is, the laser medium 3 is situated between a pair of adjacent heat sinks 2. The heat sink 2 and the laser medium 3 are bonded to each other without interposing an adhesive (in other words, they are directly bonded to each other). Here, the heat sink 2 and the laser medium 3 are bonded and laminated to each other at normal temperature via an intermediate layer 6 as described later. A portion between the laser medium 3 closest to one end side and the laser medium 3 closest to the other end side in the X direction functions as a resonator.

The heat sink 2 is a substance having a thermal conductivity comparable to or higher than that of the laser medium 3. The heat sink 2 has a function of releasing heat of the laser medium 3. The heat sink 2 forms a first element portion. The laser medium 3 is a substance that forms an inverted population with amplification exceeding absorption in an excited state, and amplifies light by means of induced emission. The laser medium 3 is also referred to as a gain medium. The laser medium 3 forms a second element portion.

The heat sink 2 and the laser medium 3 are transparent to emitted laser light L. The term "transparent to laser light L" (hereinafter, also referred to simply as "transparent") means that laser light L is transmitted, or specifically that laser light L passes through, while maintaining its intensity. For example, the term "transparent" as used here means that the transmittance (net transmittance excluding the Fresnel loss component) for laser light L is 95% or more, specifically 97% or more. The same applies for the term "transparent" as used below.

The first coating layer 4 is a dielectric multilayer film formed on a surface of the heat sink 2 (surface that is in contact with the atmosphere) located on one end of the laser element 1 in the X direction. The first coating layer 4 has a reflection characteristic that excitation light I is not reflected, and excitation light L is highly reflected. With the first coating layer 4, variation in refractive index between the heat sink 2 located on the one end of the laser element 1 and the atmosphere can be suppressed.

The second coating layer 5 is a dielectric multilayer film formed on a surface of the heat sink 2 (surface that is in contact with the atmosphere) located on the other end of the laser element 1 in the X direction. The second coating layer 5 has a reflection characteristic that excitation light I is highly reflected, and excitation light L is partly reflected. With the second coating layer 5, variation in refractive index between the heat sink 2 located on the other end of the laser element 1 and the atmosphere can be suppressed. In place of or in addition to at least one of the first coating layer 4 and the second coating layer 5, various other coating layers may be appropriately provided on the heat sink 2 and the laser medium 3. Accordingly, the reflection characteristics at respective interfaces of the heat sink 2 and the laser medium 3 can be adjusted as desired.

The intermediate layers 6 comprise one or more buffer layers interposed between the heat sink 2 and the laser medium 3. A part of the intermediate layer 6 is integrated with the heat sink 2 and the laser medium 3. A part of the intermediate layer 6 here is a central portion as seen in the X direction. A part of the intermediate layer 6 is transparent to the laser light L. The other part of the intermediate layer 6 is colored. The other part of the intermediate layer 6 here is an outer edge portion (peripheral edge portion) as seen in the X direction. The other part of the intermediate layer 6 is opaque to laser light L (the above-described non-transparent state). For example, the term "opaque to laser light L" here means that the transmittance for laser light L is less than 77%.

The intermediate layer 6 is a layer having high chemical resistance and corrosion resistance and high gas barrier properties. A part of the intermediate layer 6, which is transparent and integral with the heat sink 2 and the laser medium 3, includes at least one of a compound containing a constituent element of a bonded portion that is a boundary of the heat sink 2 and a compound containing a constituent element of a bonded portion that is a boundary of the laser medium 3. The other part of the intermediate layer 6 includes an element substitutable for a constituent element of at least one of the heat sink 2 and the laser medium 3. The below Table 1 provides example materials of the heat sink 2, the laser medium 3, a part of the intermediate layer 6 (a transparent portion, a substance generated by reaction during application of a giant pulse as described later) and the other part (colored portion) of the intermediate layer 6

TABLE 1

| Heat sink | Laser medium | A part of intermediate layer (transparent portion) | Other part of intermediate layer (colored portion) |
|---|---|---|---|
| $Al_2O_3$ | RE:RAG(R = Y, Sc, Lu, Gd, etc) | Mixed crystal of $Al_2O_3$ or RAG $(3R_2O_3$—$5Al_2O_3)$ with Si | Si |
| | RE:$RSiO_2$(R = Y, Sc, Lu, Gd) | Mixed crystal of $Al_2O_3$ or $RSiO_2$ with Si | Si |
| | RE:$R_2SiO_5$(R = Y, Sc, Lu, Gd) | Mixed crystal of $Al_2O_3$ or $R_2SiO_5$ with Si | Si |
| | RE:$Bi_4Si_3O_{12}$ (R = Y, Ca, Sr, Sc, Lu, Gd) | Mixed crystal of $Al_2O_3$ or $Bi_4Si_3O_{12}$ with Si | Si |
| | RE:$CaR_4(SiO_4)_3O$ (R = Y, La, Ca, Sr, Sc, Lu, Gd) | Mixed crystal of $Al_2O_3$ or $CaR_4(SiO_4)O$ with Si | Si |
| | RE:$SrR_4(SiO_4)_3O$ (R = Y, La, Ca, Sr, Sc, Lu, Gd) | Mixed crystal of $Al_2O_3$ or $SrR_4(SiO_4)O$ with Si | Si |
| | RE:RAG(R = Y, Sc, Lu, Gd) | Mixed crystal by way of substitution with Al in $Al_2O_3$ or R in RAG $(3R_2O_3$—$5Al_2O_3)$ | Al, Sc, Lu, Gd, Cr, Sm |
| | | Mixed crystal by way of substitution with Al in $Al_2O_3$ or RAG $(3R_2O_3$—$5Al_2O_3)$ | Al, Sc, Lu, Gd, Cr, Sm |
| | RE:$RAlO_3$(R = Y, Sc, Lu, Gd) | Mixed crystal by way of Si in $Al_2O_3$ or $RAlO_3$ | Si |
| | | Mixed crystal by way of substitution with Al in $Al_2O_3$ or R in $RAlO_3$ | Al, Sc, Lu, Gd, Cr, Sm |
| | | Mixed crystal by way of substitution with Al in $Al_2O_3$ or $RAlO_3$ | Al, Sc, Lu, Gd, Cr, Sm |
| | RE:$RAl_4O_7$ (R = Y, Ca, Sr, Sc, Lu, Gd) | Mixed crystal by way of Si in $Al_2O_3$ or $RAl_4O_7$ | Si |
| | | Mixed crystal by way of substitution with Al in $Al_2O_3$ or R in $RAl_4O_7$ | Al, Sc, Lu, Gd, Cr, Sm |
| | | Mixed crystal by way of substitution with Al in $Al_2O_3$ or $RAl_4O_7$ | Al, Sc, Lu, Gd, Cr, Sm |
| | RE:$Y_3Sc_xAl_{(5-x)}O_{12}$ | Mixed crystal by way of Si in $Al_2O_3$ or $Y_3Sc_xAl_{(5-x)}O_{12}$ | Si |
| | | Mixed crystal by way of substitution with Al in $Al_2O_3$ or Sc in $Y_3Sc_xAl_{(5-x)}O_{12}$ | Al, Sc, Lu, Gd, Cr, Sm |
| | | Mixed crystal by way of substitution with Al in $Al_2O_3$ or $Y_3Sc_xAl_{(5-x)}O_{12}$ | Al, Sc, Lu, Gd, Cr, Sm |
| | RE:$RVO_4$(R = Y, Sc, Lu, Gd) | Mixed crystal with $Al_2O_3$, or Si, Al or the like when the coating end layer on the laser medium is a film containing Si or Al | Si, Al or the like |
| | RE:(s)FAP or RE:(s)VAP | Mixed crystal with $Al_2O_3$, or Si, Al or the like when the coating end layer on the laser medium is a film containing Si or Al | Si, Al or the like |
| | RE:RCOB(R = Y, Sc, Lu, Gd) | Mixed crystal with $Al_2O_3$, or Si, Al or the like when the coating end layer on the laser medium is a film containing Si or Al | Si, Al or the like |
| | RE:RLF (R = Y, Lu, etc.) | Mixed crystal with $Al_2O_3$, or Si, Al or the like when the coating end layer on the laser medium is a film containing Si or Al | Si, Al or the like |
| | RE:$CaF_2$, $SrF_2$, etc. | Mixed crystal with $Al_2O_3$, or Si, Al or the like when the coating end layer on the laser medium is a film containing Si or Al | Si, Al or the like |

Here,

RE refers to an added rare earth element such as Ce, Pr, Nd, Sm, Eu, Tb, Dy, Ho, Er, Tm or Yb, TM refers to an added transition metal element such as Mg, Ca, Mn, Fe, Co, Ni, Cu, Zn, Cr, Ti, Te, Nb or V, and the coating end layer refers to one or more coating layers provided on at least one of the heat sink 2 on the laser medium 3 side and the laser medium 3 on the heat sink 2 side, and situated on the outermost surface side that is a side closest to the counterpart (laser medium 3 side or heat sink 2 side). See also a fourth group of example embodiments as described later.

A part of the intermediate layer 6 is a mixed crystal of a constituent element of the heat sink 2, a constituent element of the laser medium 3 and a constituent element of the other part of the intermediate layer 6. A part of the intermediate layer 6 is a portion formed by phase transition of a constituent element of the other part of the intermediate layer 6. Existence of a part of the intermediate layer 6, which is integrated with the heat sink 2 and the laser medium 3, can be known from an increase in concentration of a constituent element of the intermediate layer 6 (element of the other part of the intermediate layer 6).

Next, an example method for manufacturing the laser element 1 will be described.

As an outline of the example method for manufacturing the laser element 1, first a plurality of heat sinks 2 and a plurality of laser media 3 are prepared. The first coating layer 4 and the second coating layer 5 are appropriately deposited on the heat sink 2. For the deposition, various known film deposition methods can be employed. The heat sink 2 and the laser medium 3 are bonded to each other without interposing an adhesive while heat sinks 2 and laser media 3 are laminated (e.g., a plurality of heat sinks 2 and laser media 3 are disposed) so as to be alternately arranged.

Hereinafter, an example bonding step of bonding the heat sink 2 and the laser medium 3 to each other will be described in detail. FIGS. 2A to 4B are diagrams for illustrating the example bonding step. In FIGS. 2A to 4B, bonding of one heat sink 2 and one laser medium 3 is shown as an example for convenience of explanation. In FIGS. 2A to 4B, the heat sink 2 and the laser medium 3 are shown by a cross-section taken along line A-A in FIG. 1, but the cross-section is not hatched (the same applies in other sectional drawings).

As shown in FIG. 2A, the heat sink 2 and the laser medium 3 are disposed in a chamber 11, and the inside of the chamber 11 is brought into a substantially evacuated environment (i.e., an environment existing in a substantial vacuum). The intermediate layer 6 is formed on a surface of each of the heat sink 2 and the laser medium 3 by sputtering. The thickness of the intermediate layer 6 is, for example, about 10 nm on one side. The intermediate layer 6 contains an element substitutable for a constituent element of at least one of the heat sink 2 and the laser medium 3, and is colored. As materials of the heat sink 2, the laser medium 3 and the intermediate layer 6 to be used, mention is made of, for example, the materials shown in the "heat sink", "laser medium" and "the other part (colored portion) of intermediate layer" in Table 1, respectively. The intermediate layer 6 may be formed by vapor deposition in place of sputtering (the same applies for sputtering below).

As shown in FIG. 2B, the heat sink 2 and the laser medium 3 are bonded and fixed by surface activation normal temperature bonding with the intermediate layer 6 disposed between the heat sink 2 and the laser medium 3 (first step). The surface activation normal temperature bonding (hereinafter, also referred to simply as "normal temperature bonding") is a method in which oxide films or surface deposits on bonding surfaces of materials bonded in evacuated are removed by ion beam irradiation or FAB (neutral atomic beam) irradiation, and bonding surfaces which are flat and have constituent atoms exposed thereon are bonded to each other. The normal temperature bonding comprises direct bonding using intermolecular bonding.

Specifically, a surface of the heat sink 2 on the intermediate layer 6 side and a surface of the laser medium 3 on the intermediate layer 6 side are irradiated with an ion beam of argon (Ar) or the like or FAB (neutral atomic beam) under a substantially evacuated environment. Accordingly, oxygen or the like adsorbed on the surface is removed to form a new surface including dangling bonds. The substantially evacuated environment is, for example, a evacuated or reduced-pressure atmosphere having a background pressure of $1\times10^{-8}$ Pa or more and less than atmospheric pressure.

As an ion beam or FAB (neutral atomic beam), not only argon, but also a rare gas or inert gas such as neon (Ne), krypton (Kr), xenon (Xenon), helium (He), or any combination thereof, can be employed. A rare gas hardly causes a chemical reaction, and therefore does not significantly change the chemical properties of a surface to be irradiated. By accelerating particles of an ion beam toward the bonding surface using a particle beam source or a plasma generator, predetermined kinetic energy can be imparted to the ion beam or FAB (neutral atomic beam).

Figure 3A:
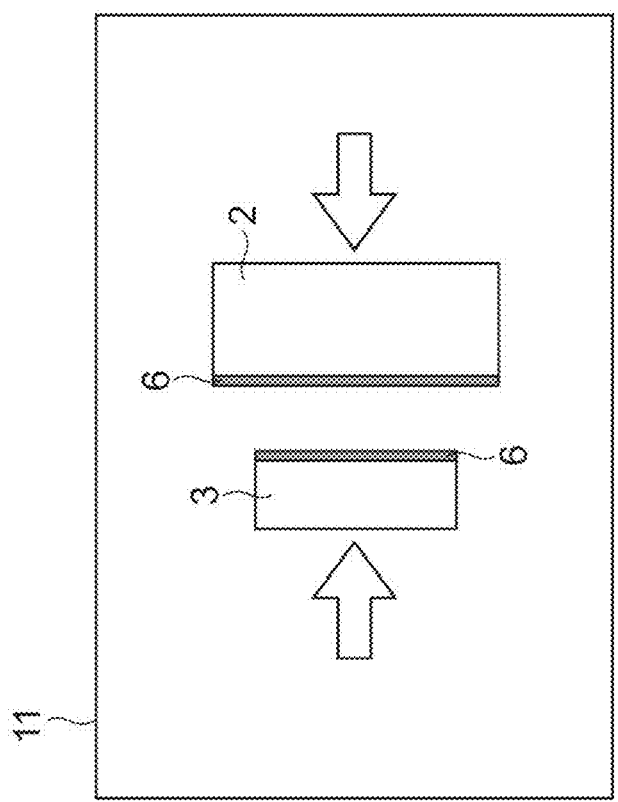
FIG. 3A is a diagram illustrating the continuation of FIG. 2B.
Figure 3B:
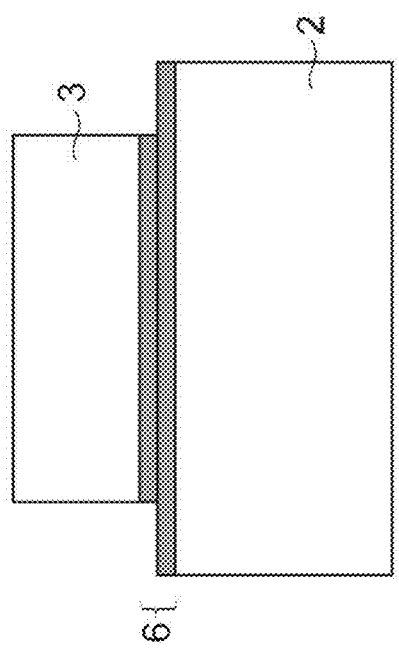
FIG. 3B is a diagram illustrating the continuation of FIG. 3A.

As shown in FIG. 3A, the heat sink 2 and the laser medium 3 are opposite to each other with respect to the intermediate layers 6. At room temperature, new surfaces of the heat sink 2 and the laser medium 3, where dangling bonds are exposed, are brought into contact with each other in a substantially evacuated environment. Accordingly, as shown in FIG. 3B, a bonding force is generated by interaction between the atoms, and the heat sink 2 and the laser medium 3 are firmly bonded to each other via the intermediate layer(s) 6. The substantially evacuated environment is, for example, a evacuated or reduced-pressure atmosphere having a background pressure of $1.5\times10^{-6}$ Pa or less. A predetermined pressure (1.5 to 2.0 MPa) may be applied to the heat sink 2 and the laser medium 3 which are brought into contact with each other.

Figure 4B:
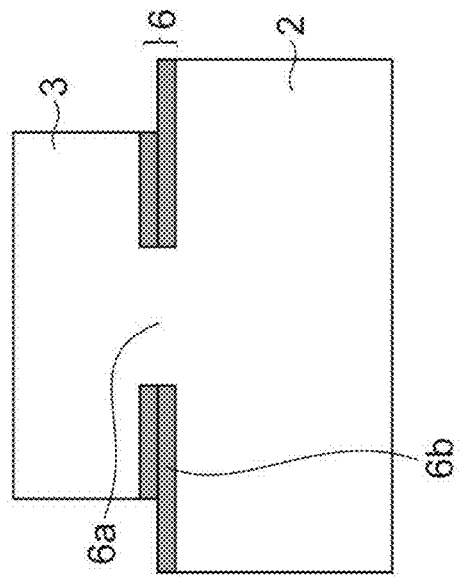
FIG. 4B is a diagram illustrating the continuation of FIG. 4A.
Figure 4A:
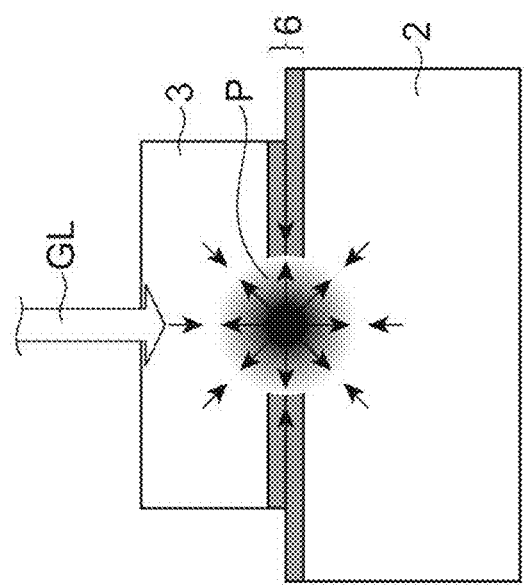
FIG. 4A is a diagram illustrating the continuation of FIG. 3B.

As shown in FIG. 4A, the intermediate layer 6 is irradiated with the giant pulse laser light GL, causing the giant pulse laser light GL to be absorbed into the intermediate layer 6 (second step). Accordingly, a shock wave P is generated in the inter mediate layer 6, and the shock wave P is forced back by the heat sink 2 and the laser medium 3, so that the intermediate layer 6 is brought into an instantaneous high-temperature and high-pressure state. Accordingly, as shown in FIG. 4B, a central portion 6a of the intermediate layer 6 is diffused into the heat sink 2 and the laser medium 3 as bonding base materials, or subjected to phase transition, so that the central portion 6a is integrated with the heat sink 2 and the laser medium 3, and made transparent. On the other hand, an outer edge portion 6b, which is the other part of the intermediate layer 6, remains colored.

Giant pulse laser light GL is laser light capable of generating a shock wave P. Giant pulse laser light GL is laser light having a sub-nanosecond pulse width. Giant pulse laser light GL can be obtained using a micro-laser and a system thereof. In some examples, Giant pulse laser light GL is laser light in a region where the pulse width is 10 ns or less and 1 ps or more (particularly, 1 ns or less and 10 ps or more).

Figure 19:
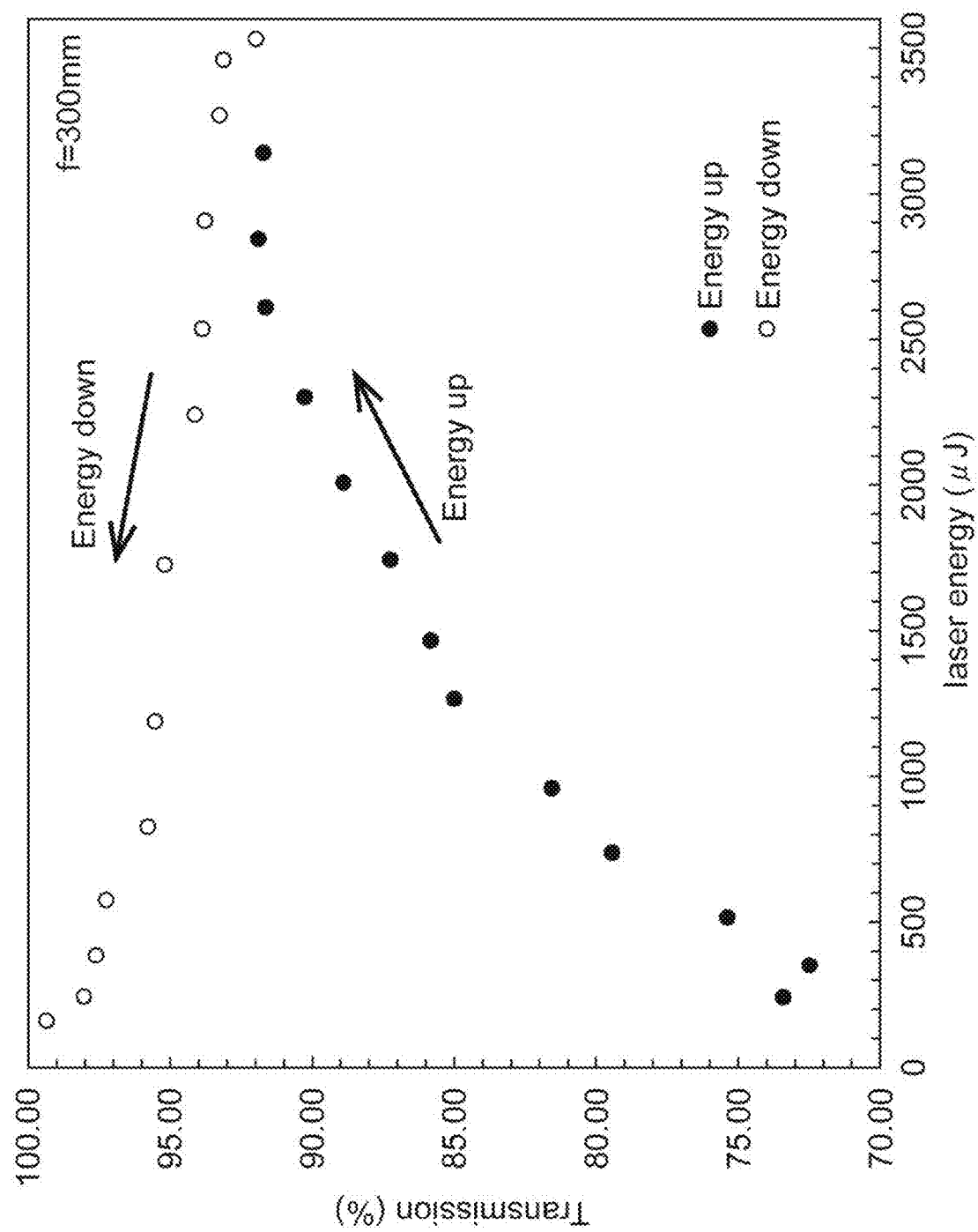
FIG. 19 is a graph showing one example of the incident light energy dependency of the incident giant pulse laser light transmission property of a quartz substrate bonded with interposition of an intermediate layer.

FIG. 19 is a graph showing one example of the incident light energy dependency of the incident giant pulse laser light transmission property of a quartz substrate bonded with interposition of the intermediate layer 6 composed of silicon. Here, a giant pulse laser light GL has a pulse width of 0.6 ns and a wavelength of 1064 nm, the pulse laser GL is condensed and applied to a quartz substrate (sample) using a condensing lens having a focal length of 300 mm, and transmitted incident light energy (laser energy) is plotted using an energy meter (this graph shows a correct transmittance because Fresnel loss is excluded). Giant pulse laser light GL is obtained by using a system including a micro-laser, an incident energy control unit, an output energy monitoring unit, and the like. The system is not particularly limited, and various systems can be used.

The "Energy UP" in the drawing refers to a state in which the giant pulse laser light GL is applied first, and laser energy thereof is steadily increased. As incident light energy increases, the intermediate layer 6 used for bonding is subjected to phase transition to turn transparent. When the amount of incident light energy exceeds about 2.5 mJ, the intermediate layer 6 is saturated, but is not completely transparent at a glance. This may be because the giant pulse laser light GL used for making the intermediate layer transparent and performing measurement is a Gaussian beam (profile), and even though the beam center is made sufficiently transparent, photoreaction at the periphery of the beam center is insufficient, and therefore the intermediate layer is not made sufficiently transparent. It is considered that when laser energy is reduced from the maximum input level, i.e. in the case of "Energy down" in the drawing, the transmittance remains maximum, but since the giant pulse laser light GL used for measurement is a Gaussian beam, the intensity distribution has a center-high shape, and turns into a dot and disappears after the radius of the distribution naturally decreases. Thus, each time laser energy is reduced, the giant pulse laser light GL passes through a portion having the highest transmittance in the intermediate layer 6, and the transmittance gradually approaches 100%.

When energy is input with an amount of much more than 3.5 mJ (the focal length of the condensing lens is 300 mm)

in the example shown in FIG. 19, the quartz substrate and so on maybe damaged, so that incident light is scattered, resulting in reduction of the transmittance. That is, it is apparent that depending on a material used for the intermediate layer 6, a certain level of the giant pulse light fluence is required for making the intermediate layer 6 transparent, immediately before the substrate (the first element portion and the second element portion) itself is damaged, to make the intermediate layer almost completely transparent.

In place of a giant pulse laser light GL, when a CW laser light with a beam diameter thinned to 300 μm is used to perform measurement, a transmittance of about 99.0% is obtained. In addition, when the focal length of the condensing lens is decreased, the transmittance is reduced because the intensity may increase excessively, which can result in damage. On the other hand, when the condensing lens is not used, light is not sufficiently condensed, and thus the intermediate layer may not be sufficiently transparent.

Figure 5A:
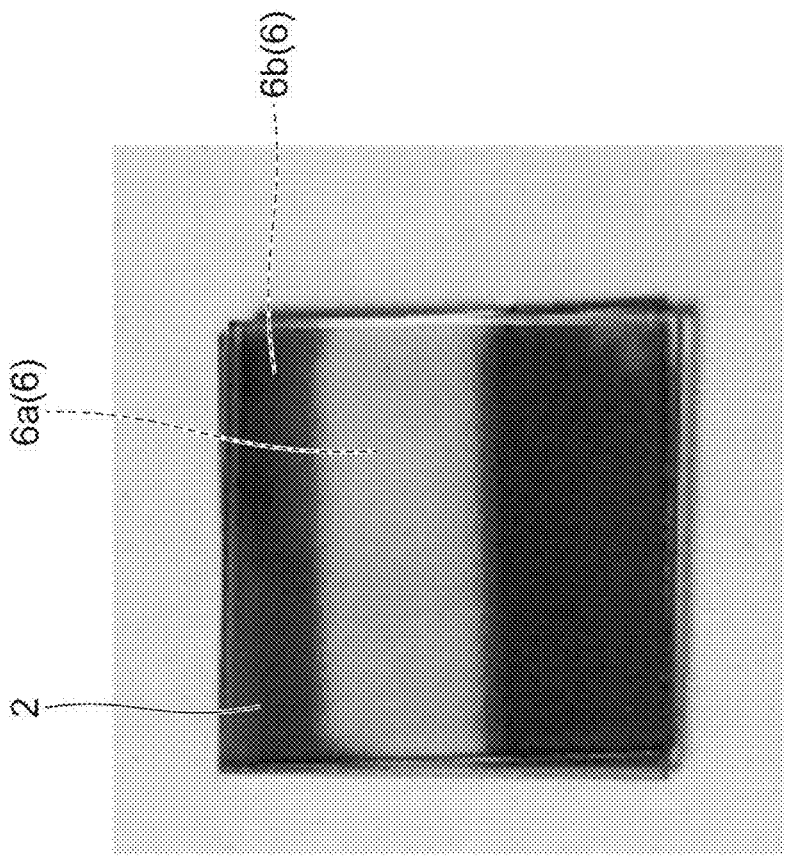
FIG. 5A is a photograph showing an appearance before application of giant pulse laser light.
Figure 5B:
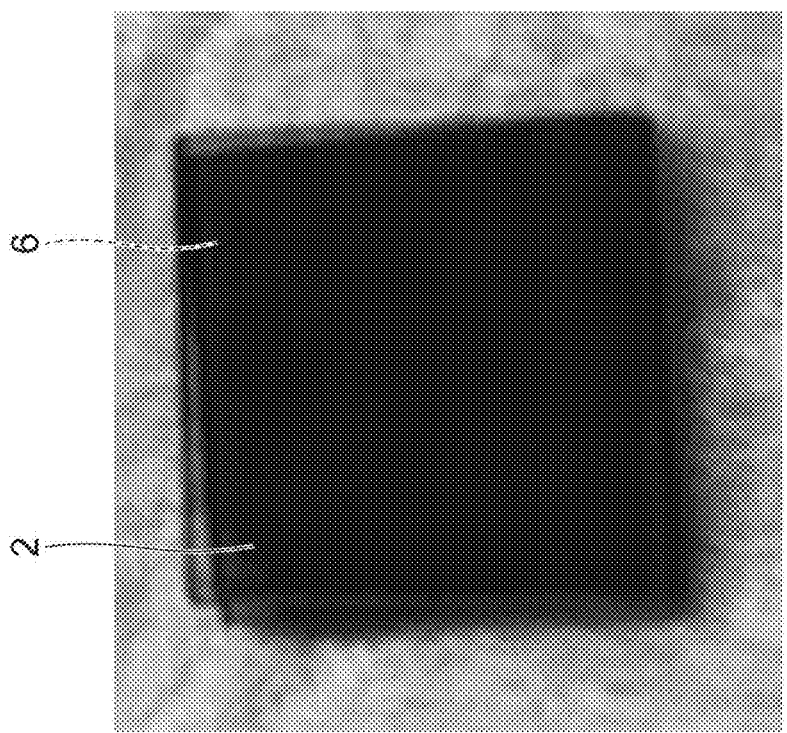
FIG. 5B is a photograph showing an appearance after application of giant pulse laser light.

FIG. 5A is a photograph showing the appearance of a sample with the intermediate layer 6 disposed between the heat sink 2 and the laser medium 3, before application of a giant pulse laser light GL. FIG. 5B is a photograph showing an appearance of the sample after application of giant pulse laser light GL. In the sample shown in FIGS. 5A and 5B, sapphire is used for the heat sink 2, YAG is used for the laser medium 3, and silicon is used for the intermediate layer 6. For the giant pulse laser light GL, the laser intensity is 900 $MW/cm^2$, the beam diameter is 1.42 mm, the pulse energy is 5 mJ, the pulse width is 700 ps, and the wavelength is 1064 nm.

The color of the sample before irradiation, as shown in FIG. 5A, is brown due to existence of the intermediate layer 6. In the sample before irradiation, the transmittance is 77%. In the sample after irradiation, as shown in FIG. 5B, a part of the intermediate layer 6 (belt-shaped portion extending laterally in the drawing) is decolored and transparent. In the sample after irradiation, the transmittance is 97%.

Figure 6B:
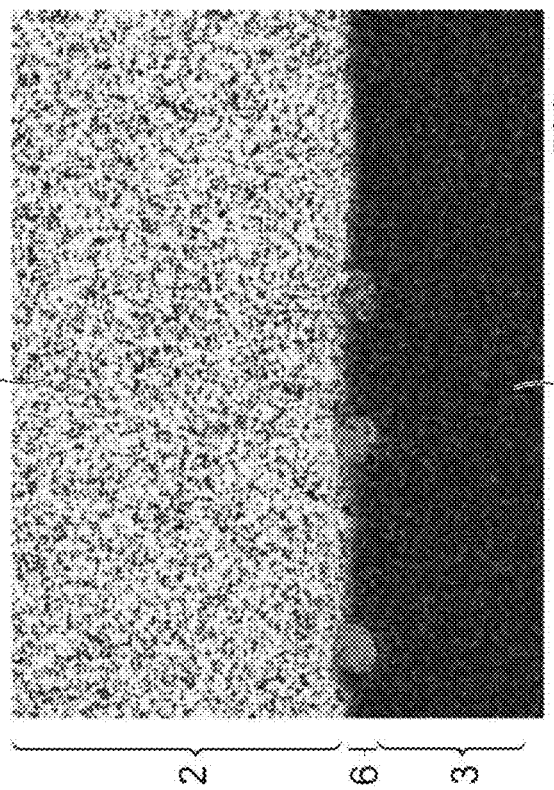
FIG. 6B is an enlarged view showing the intermediate layer after application of giant pulse laser light.
Figure 6A:
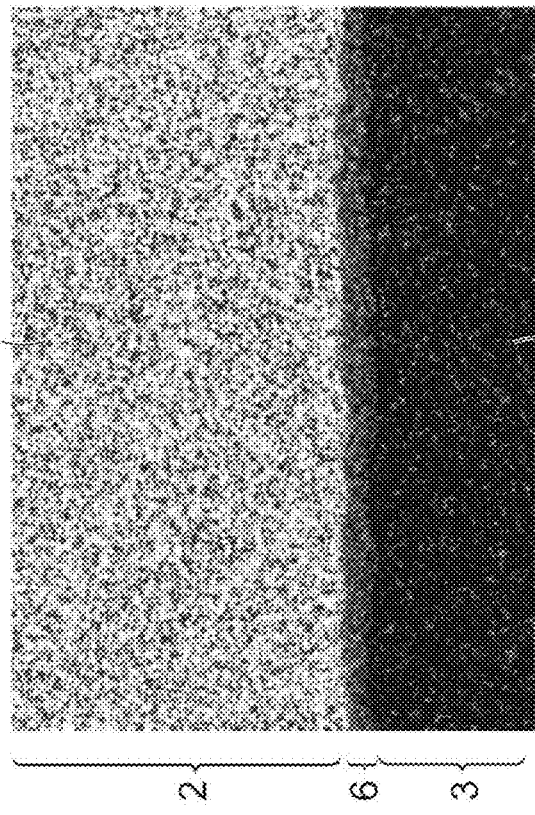
FIG. 6A is an enlarged view showing an intermediate layer before application of giant pulse laser light.

FIG. 6A is an enlarged view showing the intermediate layer 6 disposed between the heat sink 2 and the laser medium 3, before application of a giant pulse laser light GL. FIG. 6B is an enlarged view showing the sample after application of giant pulse laser light GL. In the sample shown in FIGS. 6A and 6B, sapphire is used for the heat sink 2, YAG is used for the laser medium 3, and silicon is used for the intermediate layer 6. The enlarged view in FIGS. 6A and 6B is EDX (energy dispersive X-ray spectroscopy) data.

As shown in FIG. 6A, each of sapphire, silicon and YAG is observed in the sample before irradiation. As shown in FIG. 6B, it is confirmed that silicon is eliminated or scattered in the sample after irradiation. In the sample after irradiation, silicon is integrated with constituent elements in YAG and sapphire as a substitution.

Thus, in one or more example methods for manufacturing the laser element 1, the heat sink 2 and the laser medium 3 are bonded to each other without interposing an adhesive therebetween, and the intermediate layer 6 is interposed between the heat sink 2 and the laser medium 3. By interposing the intermediate layer 6, the bonding area between the heat sink 2 and the laser medium 3 can be increased, so that the bonding strength can be enhanced. The heat sink 2 and the laser medium 3 can be firmly bonded to each other to provide a small and simple configuration of the laser element 1. In addition, since a part of the originally colored intermediate layer 6 is integrated with the heat sink 2 and the laser medium 3, and made transparent to laser light L, an increase in loss of laser light L due to existence of the intermediate layer 6 can be suppressed. Thus, with the method for manufacturing the laser element 1, loss of emitted laser light L may be reduced while providing a small and simple configuration.

In the method for manufacturing the laser element 1, the heat sink 2 and the laser medium 3 are bonded to each other at normal (e.g., ambient or room) temperature via the intermediate layer 6. Thereby, the heat sink 2 and the laser medium 3 can be bonded and fixed with high bonding strength. The heat sink 2 and the laser medium 3 can be bonded to each other without generating voids at the bonding interface. Noting temperature bonding makes it possible to attain very firm bonding.

When an advanced method of normal temperature bonding such as surface activation normal temperature bonding with the intermediate layer 6 is employed in manufacturing of the laser element 1, the following effects are also exhibited. Surface activation normal temperature bonding may be used to bond not only the same kind of materials, but also to bond different kinds of materials, which are generally difficult to bond. Any material such as metal, glass and film can be bonded. Heat is not applied, and thus deformation by heat can be suppressed. An adhesive is not needed. Bonding strength can be controlled. It is possible to perform not only firm bonding but also provisional bonding which is followed by peeling. The bonding time is short, and therefore in principle, bonding can be completed in seconds. Displacement does not occur after bonding, and high alignment accuracy can be achieved.

In an example method for manufacturing the laser element 1, the heat sink 2 includes diamond, silicon carbide, sapphire, garnet containing YAG, a single crystal of sesquioxide, a ceramic, glass, organic materials, or any combination thereof. The laser medium 3 includes garnet containing YAG, a single crystal of sesquioxide, a ceramic, glass, organic materials, or an optical material including laser gain medium containing sapphire, or any combination thereof. In bonding of the heat sink 2 and the laser medium 3 at normal temperature, at least one of silicon, aluminum, scandium, lutetium, gadolinium, carbon, or any combination thereof which is used as the constituent elements of one or both of the heat sink 2 and the laser medium 3, is disposed between the heat sink 2 and the laser medium 3. Accordingly, when the intermediate layer 6 is irradiated with a giant pulse laser light GL, and the central portion 6a of the intermediate layer 6 is integrated with the heat sink 2 and the laser medium 3, the central portion 6a of the intermediate layer 6 can be constituted by a stable compound.

In an example method for manufacturing the laser element 1, the intermediate layer 6 is formed on the heat sink 2 and the laser medium 3 by sputtering. Accordingly, a configuration in which the intermediate layer 6 is disposed between the heat sink 2 and the laser medium 3 can be practically provided by sputtering. The method for forming the intermediate layer 6 is not limited to sputtering, and may be a plasma-enhanced chemical vapor deposition method or other similar methods.

In an example method for manufacturing the laser element 1, the central portion 6a of the intermediate layer 6 is made transparent, and the outer edge portion 6b, which is another part of the intermediate layer 6, remains colored. In some examples, the giant pulse laser light GL may not be absorbed to make the intermediate layer transparent over the entire region of the intermediate layer 6, and thus production can be simplified. In addition, such an inter mediate layer 6 can also be used as an aperture.

In the laser element 1, the heat sink 2 and the laser medium 3 are bonded to each other without interposing an adhesive therebetween, and the intermediate layer 6 is interposed between the heat sink 2 and the laser medium 3. By interposing the intermediate layer 6, the bonding area between the heat sink 2 and the laser medium 3 can be increased, so that the bonding strength can be enhanced. The heat sink 2 and the laser medium 3 can be firmly bonded to each other to provide a small and simple configuration of the laser element 1. In addition, since a part of the intermediate layer 6 is integrated with at least one of the heat sink 2 and the laser medium 3, and made transparent to laser light L, an increase in loss of laser light L due to existence of the intermediate layer 6 can be suppressed. Thus, with the laser element 1, loss of emitted laser light L may be reduced while providing a small and simple configuration.

In the laser element 1, a part of the intermediate layer 6 includes at least one of a compound containing a constituent element of the heat sink 2 and a compound containing a constituent element of the laser medium 3. Accordingly, a configuration in which a part of the intermediate layer 6 is integrated with at least one of the heat sink 2 and the laser medium 3 can be practically provided.

In the laser element 1, the central portion 6a of the intermediate layer 6, is transparent to laser light L, and the outer edge portion 6b, which is the other part of the intermediate layer 6, is colored. The intermediate layer 6 can also be used as an aperture.

In an example method for manufacturing the laser element 1, a plurality of heat sinks 2 and laser media 3 are disposed in such a manner that the heat sinks 2 and laser media 3 are alternately arranged to provide a high-power small integrated laser apparatus 100 with a DFC structure.

In the laser medium 3 formed of a ceramic, surface precision may not be improved even when the laser medium 3 is polished, and therefore the damage threshold in optical coating is lower than that of a single crystal by 1 digit or more. In this respect, an optical coating is applied not to the laser medium 3 but to the heat sink 2 formed of a single crystal of sapphire or the like, so that the first coating layer 4 and the second coating layer 5 are formed. That is, the ceramic is not coated directly, but is coated with a bonding single crystal interposed between the ceramic and the coating to increase resistance 30 to 40 times.

The position, size and range of the transparent integrated part of the intermediate layer 6 may be modified in arrangement and detail. By controlling at least one of the condition for irradiating the intermediate layer 6 with giant pulse laser light GL, the position of the irradiation, scanning of giant pulse laser light GL, the range of the scanning, and so on, the part of the intermediate layer 6 can be provided at a desired position, with a desired size and over a desired range.

The intermediate layer 6 may contain an element substitutable for a constituent element of at least one of the heat sink 2 and the laser medium 3. The central portion 6a of the intermediate layer 6 may be integrated with only one of the heat sink 2 and the laser medium 3. In some examples, the colored portion of the intermediate layer 6 (i.e. the outer edge portion 6b which is the other part of the intermediate layer 6) in the laser element 1 as a manufactured finished product corresponds to the intermediate layer 6 before application of the giant pulse laser light GL in the manufacturing stage.

Generally, when irradiated with an ion beam, a surface of the base material to be bonded at normal temperature is exposed to plasma, so that the molecular structure is collapsed, leading to deterioration of smoothness (e.g., irregularities are generated). Thus, it is sometimes difficult to perform normal temperature bonding. In some examples, normal temperature bonding is performed (i.e. a film that can be bonded by normal temperature bonding is deposited) with the intermediate layer 6 interposed between base materials, and the number of types of base materials bondable at normal temperature can be increased.

In a Q switch-type microchip laser, a shorter pulse can be generated with a shorter resonator. In an end face excitation-type microchip laser using Nd:YAG as a laser medium and Cr:YAG as a passive Q switch medium, Nd:YAG is normally made short for shortening the resonator. The absorption efficiency of excitation light is defined as $\eta = 1 - \exp(\alpha L_0)$ where $L_0$ is a length of Nd:YAG, and $\alpha$ is an excitation light absorption efficiency. In other words, when the length $L_0$ of Nd:YAG is reduced, the absorption efficiency decreases in accordance with the foregoing formula. Thus, a configuration is employed in which a high-reflection coating with respect to an excitation wavelength is applied to a surface opposite to the excitation side (Cr:YAG boundary surface), so that $L_0$ is reduced to a half. However, when bonding is performed by a sintering method that is used for ceramic YAG, a coating layer obstructs bonding. Thus, a bonding chip from ceramic YAG is generally long, and the resulting pulse width is also long, resulting in a laser light source with low performance.

When applied to such a bonding element, a microchip capable of generating a pulse having a short width can be expected from ceramic YAG. When bonding over a large area, a ceramic YAG composite can also be formed with a large area at a time, and cut into small chips to attain a mass production effect and cost reduction. In some examples, the base materials are bonded via the intermediate layer to further increase the area and perform bonding with higher bonding strength. Accordingly, a low cost mass production of optical elements with an increased size may be achieved, having high performance and high reliability.

Second Group of Example Embodiments

Next, a second group of example embodiments will be described. In the description of the second group of example embodiments, matters different from those in the first group of example embodiments will be described.

FIGS. 7A, 7B, 8A and 8B are diagrams for illustrating a bonding step according to the second group of example embodiment. As shown in FIG. 7A, an intermediate layer 6 is formed only on a surface of a laser medium 3 by sputtering in a chamber 11 in a substantially evacuated environment. Under the substantially evacuated environment, a surface of a heat sink 2 and a surface of the laser medium 3 on the intermediate layer 6 side are irradiated with an ion beam or FAB (neutral atomic beam) to form a new surface on each of the surfaces of the heat sink 2 and laser medium 3, and the new surfaces are brought into contact with each other. Accordingly, as shown in FIG. 7B, the heat sink 2 and the laser medium 3 are firmly bonded to each other via the intermediate layer 6.

Figures 8A, 8B:
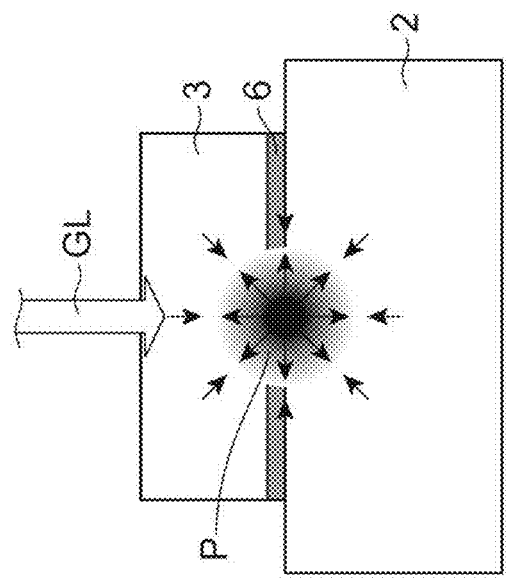
FIG. 8A is a diagram illustrating the continuation of FIG. 7B.
FIG. 8B is a diagram illustrating the continuation of FIG. 8A.

As shown in FIG. 8A, the intermediate layer 6 is irradiated with giant pulse laser light GL, causing the giant pulse laser light GL to be absorbed into the intermediate layer 6. Accordingly, a shock wave P is generated in the intermediate layer 6, and the shock wave P is forced back by the heat sink 2 and the laser medium 3, so that the intermediate layer 6 is brought into an instantaneous high-temperature and high-pressure state. Accordingly, as shown in FIG. 8B, a central portion 6a of the intermediate layer 6 is diffused into the heat sink 2 and the laser medium 3, or subjected to phase transition, so that the central portion 6a is integrated with the heat sink 2 and the laser medium 3, and made transparent. On the other hand, an outer edge portion 6*b*, which is another part of the intermediate layer 6, remains colored.

Thus, loss of emitted laser light L may be reduced while providing a small and simple configuration.

Third Group of Example Embodiments

Next, a third group of example embodiments will be described. In the description of the third group of example embodiments, matters different from those in the second group of example embodiments will be described.

FIGS. 9A and 9B is a diagram for illustrating a bonding step according to the third group of example embodiments. As shown in FIG. 9A, a thin intermediate layer 6 having a sheet shape is disposed between a heat sink 2 and a laser medium 3 in a chamber 11 in a substantially evacuated environment. Under the substantially evacuated environment, the intermediate layer 6 is sandwiched between the heat sink 2 and the laser medium 3, and the heat sink 2 and the laser medium 3 are bonded to each other at normal temperature via the intermediate layer 6. Accordingly, as shown in FIG. 9B, the heat sink 2 and the laser medium 3 are firmly bonded to each other via the intermediate layer 6. Thereafter, the intermediate layer 6 is irradiated with giant pulse laser light GL.

Thus, a loss of emitted laser light L may be reduced while providing a small and simple configuration.

In one or more examples, the intermediate layer 6 having a sheet shape is sandwiched between the heat sink 2 and the laser medium 3, and they are fixed. A configuration in which the intermediate layer 6 is disposed between the heat sink 2 and the laser medium 3 can be practically provided when the intermediate layer 6 has a sheet shape.

Fourth Group of Example Embodiments

Next, a fourth group of example embodiments will be described. In the description of the fourth group of example embodiments, matters different from those in the first group of example embodiments will be described.

FIGS. 10A, 10B, 11A and 11A are diagrams for illustrating a bonding step according to the fourth group of example embodiments. An optical coating is applied to a surface of a heat sink 2 to form a coating layer 12 on the surface of the heat sink 2. The coating layer 12 is a part of the heat sink 2, and forms the surface side in the heat sink 2. The optical coating is not particularly limited, and various known optical coatings can be employed. The coating layer 12 is configured such that crystal mixture or element substitution of Si, Al or the like in, for example, SiO$_2$ or Al$_2$O$_3$, or YAG or the like with an intermediate layer 6 occurs.

As shown in FIG. 10A, the intermediate layer 6 is formed on a surface of a laser medium 3 and the coating layer 12 of the heat sink 2 by sputtering in a chamber 11 in a substantially evacuated environment. The intermediate layer 6 here is formed of an element substitutable for a constituent element of at least one of the coating layer 12 and the laser medium 3. Under the substantially evacuated environment, a surface of the coating layer 12 on the intermediate layer 6 side and a surface of the laser medium 3 on the intermediate layer 6 side are irradiated with an ion beam or FAB (neutral atomic beam) to form a new surface on each (i.e., both) of the facing surfaces of the coating layer 12 and laser medium 3, and the new surfaces are brought into contact with each other. Accordingly, as shown in FIG. 10B, the coating layer 12 of the heat sink 2 and the laser medium 3 are firmly bonded to each other via the intermediate layer 6.

As shown in FIG. 11A, the intermediate layer 6 is irradiated with a giant pulse laser light GL, causing the giant pulse laser light GL to be absorbed into the intermediate layer 6. Accordingly, a shock wave P is generated in the intermediate layer 6, and the shock wave P is forced back by the coating layer 12 of the heat sink 2 and the laser medium 3, so that the intermediate layer 6 is brought into an instantaneous high-temperature and high-pressure state. Accordingly, as shown in FIG. 11B, a central portion 6*a* of the intermediate layer 6, is diffused into the coating layer 12 as the end layer of the heat sink 2 and the laser medium 3, or subjected to phase transition, so that the central portion 6*a* is integrated therewith, and made transparent. In the example shown in FIG. 11B, the central portion 6*a* of the intermediate layer 6 is integrated not only with the coating layer 12 but also with a part of the heating sink 2 which is inside the coating layer 12. An outer edge portion 6*b*, which is the other part of the intermediate layer 6, remains colored.

Thus, a loss of emitted laser light L may be reduced while providing a small and simple configuration.

In one or more examples, the coating layer 12 is provided on a bonded portion of the heat sink 2, and the central portion 6*a* of the intermediate layer is integrated with the coating layer 12. Here, the central portion 6*a* of the intermediate layer 6 can be made transparent and integrated using the coating layer 12. In addition, when the intermediate layer 6 contains an element substitutable for a constituent element of the coating layer 12, the intermediate layer 6 may not contain an element substitutable for a constituent element of a main body portion (portion other than the coating layer 12) of the heat sink 2. Thus, the degree of freedom of the configuration or the manufacturing process can be increased. Further, when the heat sink 2 includes SiC or diamond, there is a large difference in refractive index, and therefore the coating layer 12 is effective.

Fifth Group of Example Embodiments

Next, a fifth group of example embodiments will be described. In the description of the fifth group of example embodiments, matters different from those in the second group of example embodiments will be described.

Figure 12B:
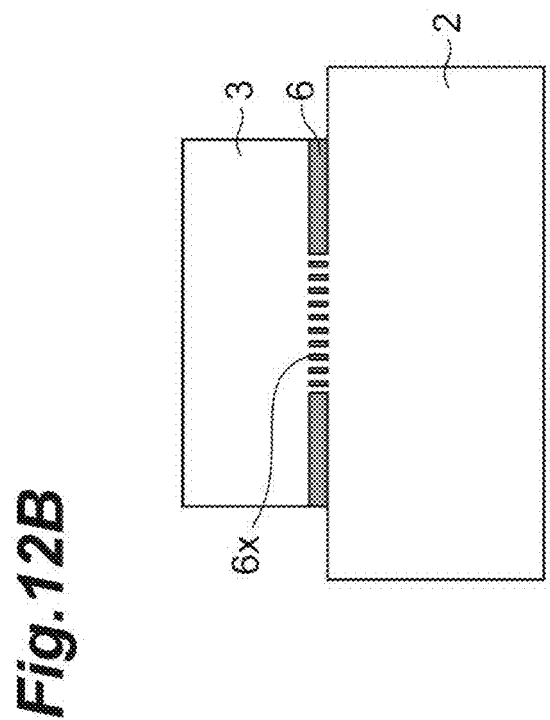
FIG. 12B is a diagram illustrating the continuation of FIG. 12A.
Figure 12A:
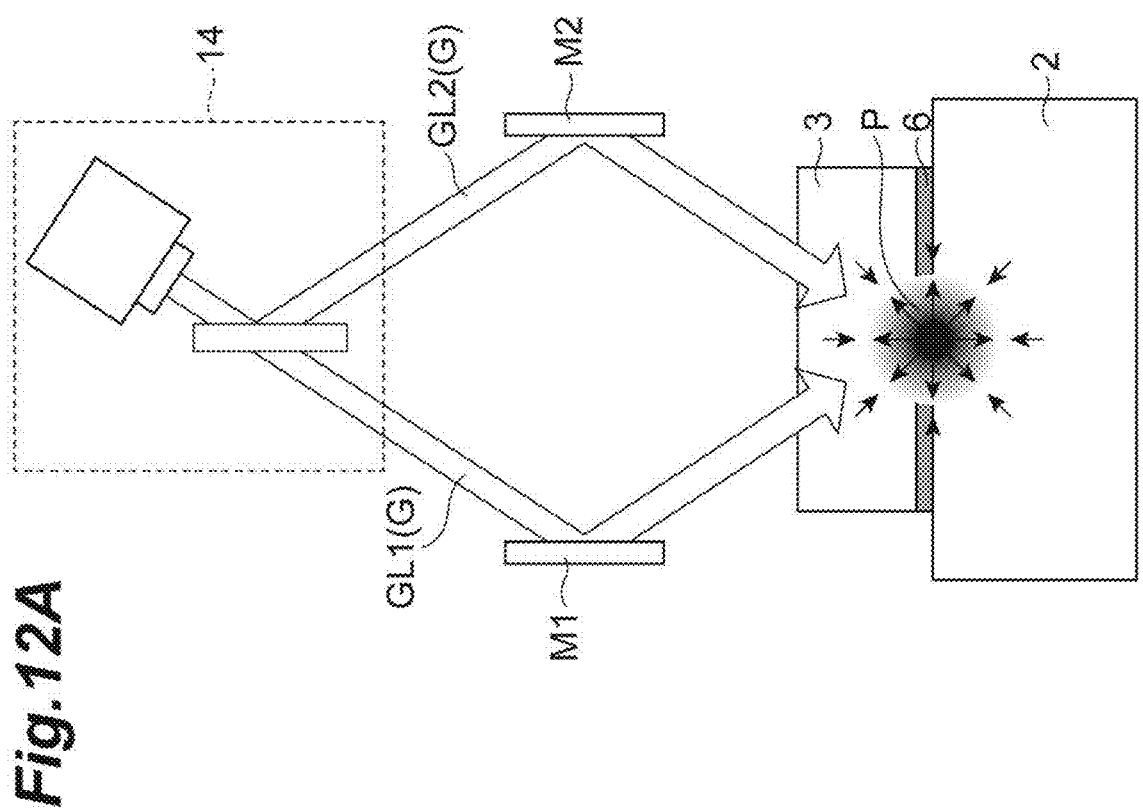
FIG. 12A is a diagram illustrating a bonding step according to a fifth group of example embodiments.

FIGS. 12A and 12B is a diagram for illustrating a bonding step according to the fifth group of example embodiments. As shown in FIG. 12A, a giant pulse laser light G is applied in such a manner that a light wave interferes in the intermediate layer 6, and thus the giant pulse laser light GL is absorbed into the intermediate layer 6. In the example shown in the drawing, a first giant pulse laser light GL1 and a second giant pulse laser light GL2 are emitted from a micro-laser 14 including a giant pulse laser light source and a beam splitter, and guided to one position in the intermediate layer 6 through mirrors M1 and M2, respectively, and a light wave of each of the first giant pulse laser GL1 and the second giant pulse laser GL2 is caused to interfere in the intermediate layer 6.

Figure 13:
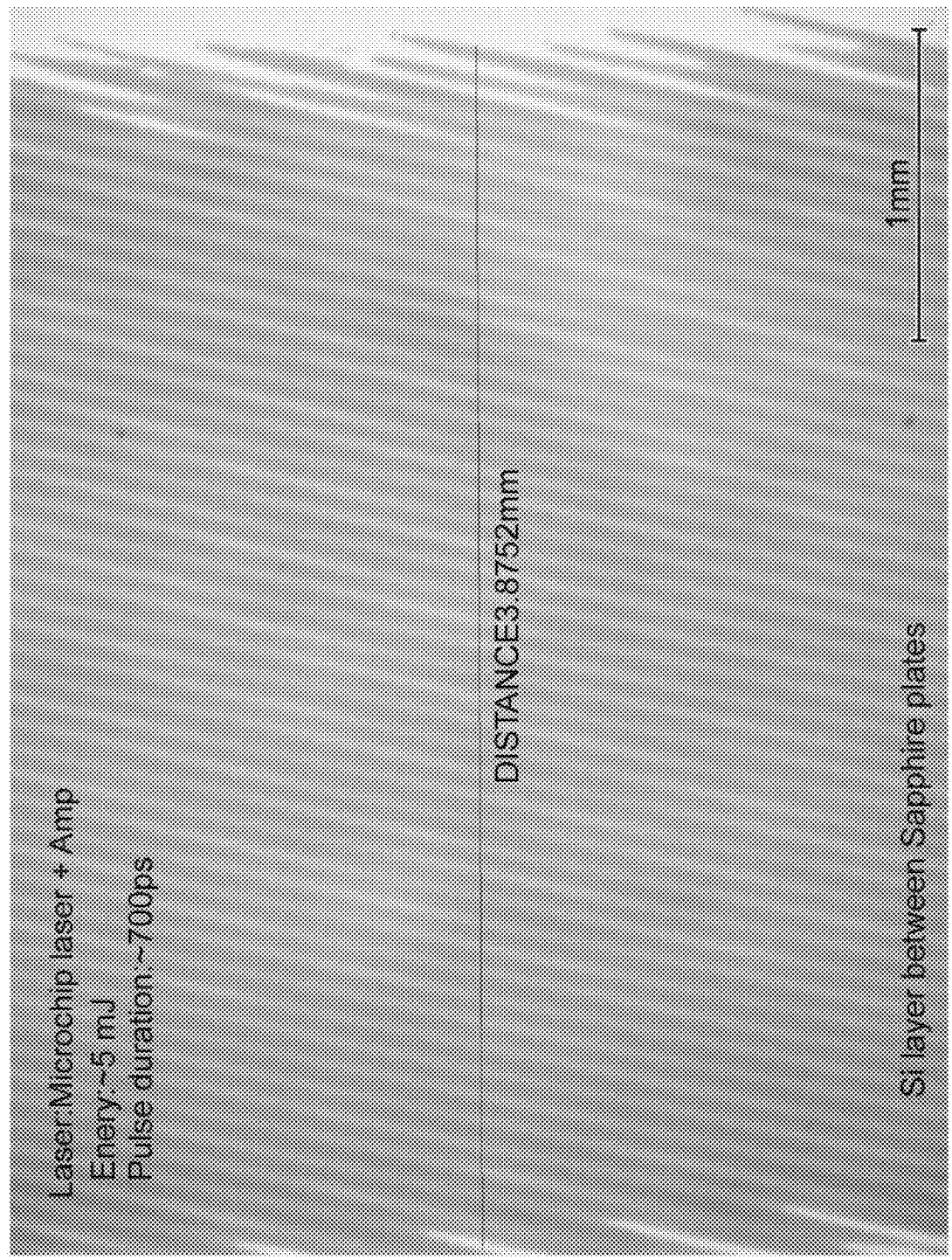
FIG. 13 is an enlarged photographic view showing a fine pattern.

Accordingly, a shock wave P is generated in the intermediate layer 6, and the shock wave P is forced back by the coating layer 12 of the heat sink 2 and the laser medium 3, so that the intermediate layer 6 is brought into an instantaneous high-temperature and high-pressure state. Accordingly, as shown in FIG. 12B, a fine pattern 6*x* including a colored portion and a transparent portion is formed in the intermediate layer 6. The fine pattern 6*x* has a function of modulating passing laser light. The fine pattern 6*x* has a fine structure having a predetermined shape. The fine pattern 6x has a fine structure corresponding to an interference of the light wave of the giant pulse laser light GL applied to the intermediate layer 6. The fine pattern 6x is a color grading pattern (picture image with an adjusted color). Here, the fine pattern 6x is a stripe pattern in which linear colored portions and linear transparent portions are alternately arranged, the pattern forming a predetermined grating (diffraction grating) (see FIG. 13).

Thus, a loss of emitted laser light L may be reduced while providing a small and simple configuration.

In one or more examples, emitted laser light L can be modulated using a fine pattern 6x. The fine pattern 6x can be used as a polarizing filter.

The example of applying a giant pulse laser light G in such a manner that a light wave interferes in the intermediate layer 6 may be modified in arrangement and detail as compared to the example in FIG. 12A. The light wave of the giant pulse laser light GL may be made to interfere in the intermediate layer 6 by using the heat sink 2 having an inclined front or back surface. Instead of, or in addition to, including a grating fine structure, the fine pattern 6x may have a linear fine structure, a lattice-like fine structure, a circular fine structure, a fine structure obtained by combining at least any of foregoing structures, or any combination thereof. In addition, patterning of giant pulse laser light GL by direct rendering (projection method) or scanning (scanning method) may be performed to form the fine pattern 6x on the intermediate layer 6. Other patterning methods can also be used for the patterning. In addition to the formation of nanostructures as performed by ultra-short pulse radiation to form the fine pattern 6x on the intermediate layer 6, various other methods can be used for fabricating nanostructures.

Sixth Group of Example Embodiments

Next, a sixth group of example embodiments will be described. In the description of the sixth group of example embodiments, matters different from those in the first group of example embodiments will be described.

Figure 14:
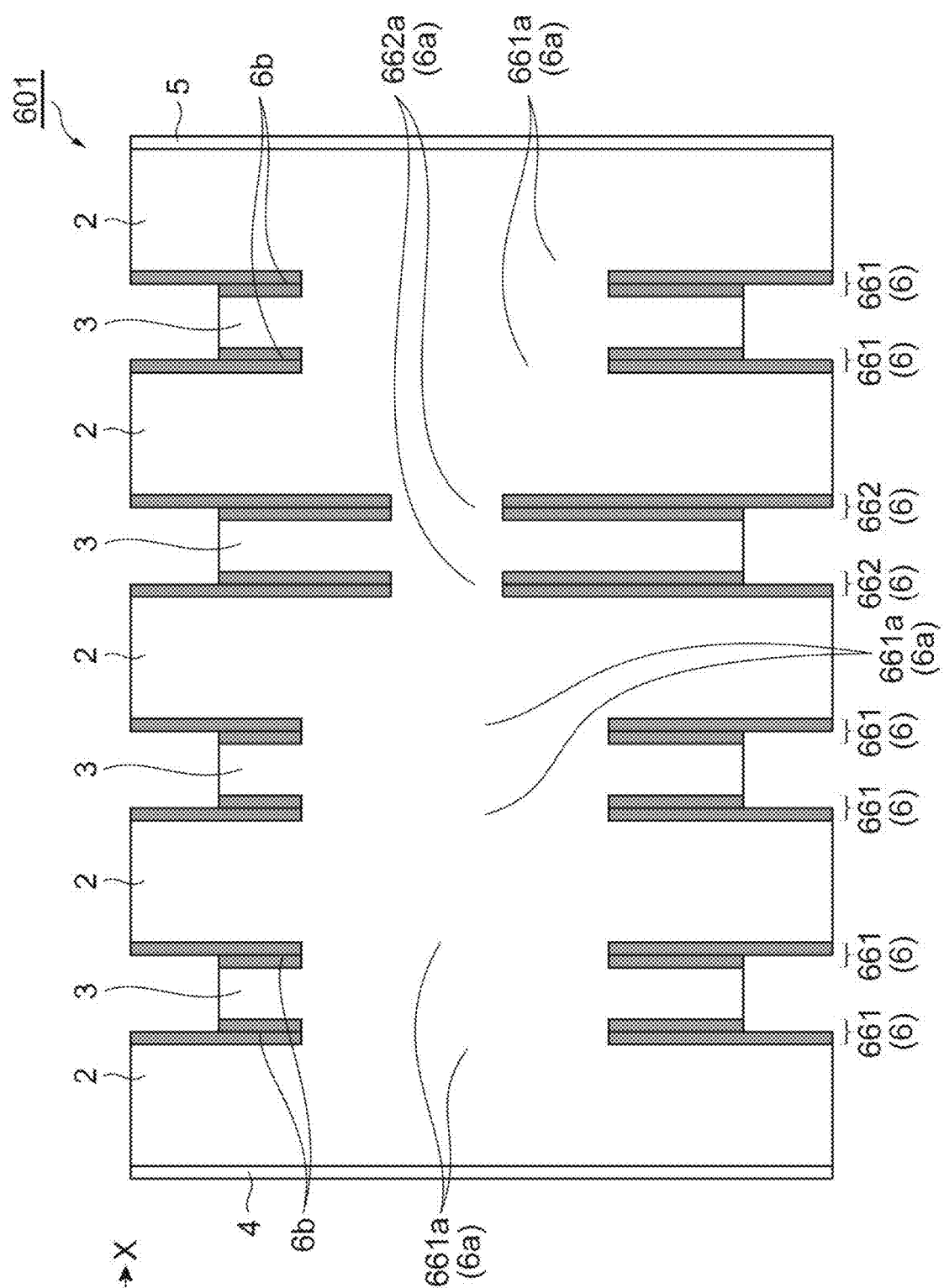
FIG. 14 is a longitudinal sectional view showing a laser element according to a sixth group of example embodiments.

FIG. 14 is a longitudinal sectional view showing a laser element 601 according to the sixth group of example embodiments. As shown in FIG. 14, the laser element 601 includes a first intermediate layer 661 and a second intermediate layer 662 as an intermediate layer 6. A central portion 661a which is a part of the first intermediate layer 661 and a central portion 662a which is a part of the second intermediate layer 662 are transparent portions integrated with the heat sink 2 and the laser medium 3. The central portion 661a extends over a wider region as compared to the central portion 662a. When seen in the X direction, the central portion 661a extends in a position and range including the central portion 662a. In the laser element 601, various other coating layers may be appropriately provided on the heat sink 2 and the laser medium 3.

Thus, a loss of emitted laser light L may be reduced while providing a small and simple configuration.

In one or more examples, a plurality of apertures (hard apertures and soft apertures) having openings of different sizes can be formed by different first intermediate layers 661 and second intermediate layers 662.

Seventh Group of Example Embodiments

Next, a seventh group of example embodiments will be described. In the description of the seventh group of example embodiments, matters different from those in the first group of example embodiments will be described.

FIG. 15 is a longitudinal sectional view showing a laser element 701 according to the seventh group of example embodiments. As shown in FIG. 15, the laser element 701 forms a micro-laser. The laser element 701 includes a laser medium 3 and a Q switch element 702 located between a pair of heat sinks 2. The Q switch element 702 is a saturable absorber having a characteristic that the absorption capability is saturated when the intensity of light incident from the laser medium 3 increases. The Q switch element 702 is bonded to the laser medium 3 via an intermediate layer 6. The Q switch element 702 is bonded to the heat sink 2 via the intermediate layer 6. In the example shown in the FIG. 15, the intermediate layer 6 located between the Q switch element 702 and the heat sink 2 has a fine pattern 6x. In some examples, the fine pattern 6x is the same as in the fifth group of embodiments.

Thus, a loss of emitted laser light L may be reduced while providing a small and simple configuration.

The Q switch element 702 may be an EO element (electro-optic element), an AO element (acousto-optic element), an MO element (magneto-optic element), or any combination thereof. In place of the Q switch element 702, a nonlinear optical element may be provided. The Q switch element 702 forms a first element portion or a second element portion.

Eighth Group of Example Embodiments

Next, an eighth group of example embodiments will be described. In the description of the eighth group of example embodiments, matters different from those in the first group of example embodiments will be described.

FIG. 16A to 16D is a longitudinal sectional view showing a nonlinear wavelength conversion element 801 according to the eighth group of example embodiments. The nonlinear wavelength conversion element 801 is an optical element having a periodic structure for performing quasi-phase matching (QPM). When the nonlinear wavelength conversion element 801 is manufactured, a plurality of quartz plates 802 are prepared, and the plurality of quartz plates 802 are bonded so as to overlap one another via an intermediate layer 806 as shown in FIG. 16A. Among the plurality of quartz plates 802, a pair of adjacent quartz plates 802 is disposed so as to have different polarities of target generated electric fields. Quartz has no spontaneous polarization, and therefore, for example, it is also effective to cross (orthogonalize) its crystal orientations. The orientations may be reversed rather than being crossed. Not only quartz, but also a compound semiconductor such as GaP, GaAs or GaN can form a wavelength conversion element when bonded with its crystal orientations changed. A ferrodielectric material such as (Mg)LN, (Mg)LT, (Rb)KTP or RTP is disposed so as to reverse spontaneous polarization, and bonded. In addition, a material which does not have a nonlinear effect is disposed to form a continuous bonding structure consistent with an integral multiple (particularly odd-number multiple) of the coherent length with regard to so called target wavelength conversion. The plurality of quartz plates 802 are bonded to one another at normal temperature via the intermediate layer 806. The thickness of the quartz plate 802 is, for example, several tens of micrometers to several hundreds of micrometers. The intermediate layer 806 is a thin film layer formed of silicon.

As shown in FIG. 16B, the intermediate layer 806 is irradiated with a giant pulse laser light GL, causing the giant pulse laser light GL to be absorbed into the intermediate layer 806. Accordingly, a shock wave P is generated in the intermediate layer 806, so that the intermediate layer 6 is brought into an instantaneous high-temperature and high-pressure state. A central portion 806a of the intermediate layer 806 is subjected to phase transition, integrated with the adjacent quartz plate 802, and made transparent. Also, the giant pulse laser light GL is scanned along the intermediate layer 806.

As shown in FIG. 16C, scanning of the giant pulse laser light GL is performed along a plurality of intermediate layers 806. Accordingly, as shown in FIG. 16D, substantially all of the plurality of intermediate layers 806 are subjected to phase transition to complete a nonlinear wavelength conversion element 801.

Thus, when manufacturing the nonlinear wavelength conversion element 801, the loss of laser light L (e.g., laser light L emitted by a laser light source with the nonlinear wavelength conversion element 801 mounted therein) which is subjected to wavelength conversion can be reduced while a small and simple configuration is provided. A large area of the nonlinear wavelength conversion element 801 may therefore be bonded with high strength.

Quartz is transparent at a wavelength of 150 nm or less, and can form a high-performance wavelength conversion element for conversion to visible light or ultraviolet light when bonded in a thickness of several tens of micrometers, and combined with a high-luminance light source. On the other hand, quartz is also used on the long-wavelength side, and can be used as a nonlinear optical element in the region of a terahertz wave which has been difficult to generate heretofore. Examples of the method for generating light having a long wavelength by a nonlinear optic include difference frequency generation and light parametric generation. Light parametric oscillation involving preparation of only one light source may be used to generate so-called high-luminance light, in which the resulting spectral width is small, but a special mirror for forming a resonator is also used. However, when backward phase matching is utilized, optical feedback automatically occurs without using the special mirror. In addition, since continuous resonance is possible, a mode hop associated with general parametric oscillation is eliminated. However, in QPM by a backward wave, the period is as short as sub-microns, and therefore it can be difficult to generate light having a long wavelength. In this respect, in a terahertz band with a long wavelength, the size can be covered by mechanical processing, and in surface activation bonding, quartz plates of several tens of micrometers to several hundreds of micrometers are periodically bonded, and quasi-phase matching by a backward wave may be used so that efficient and strong terahertz wave generation can be expected.

Additional Example Modifications

One or more of the examples described above may be modified in arrangement and detail. For example, the numerical values described above may include tolerance in design, measurement, manufacturing or the like.

In one or more examples, a first element portion and a second element portion may be fixed using a fixing tool with an intermediate layer disposed between the first element portion and the second element. Here, the first element portion and the second element portion can be fixed using the fixing tool. In addition, the first element portion and the second element portion may not be bonded before application of a giant pulse laser light.

For example, an intermediate layer 6 is formed on a surface of a heat sink 2 by sputtering, and the intermediate layer 6 is formed on a surface of a laser medium 3 by sputtering. The heat sink 2 and the laser medium 3 are mutually superposed and disposed so as to face the respective intermediate layers 6. In this case, the heat sink 2 and the laser medium 3 are not bonded to each other. As shown in FIG. 17A, the heat sink 2 and the laser medium 3 are attached to a diamond anvil cell (fixing tool) 150 (a hard transparent material such as sapphire may be used in place of diamond), and fastened with a fastener 151 to firmly hold and fix the heat sink 2 and the laser medium 3 in the thickness direction.

As shown in FIG. 17B, the intermediate layer 6 is irradiated with a giant pulse laser light GL through a diamond portion 152 of the diamond anvil cell 150. The giant pulse laser light GL is absorbed into the intermediate layer 6. Accordingly, a shock wave P is generated in the intermediate layer 6, and the shock wave P is forced back by the heat sink 2 and the laser medium 3, so that the intermediate layer 6 is brought into an instantaneous high-temperature and high-pressure state. A part of the intermediate layer 6 is diffused into the heat sink 2 and the laser medium 3, or subjected to phase transition, so that the part of the intermediate layer 6 is integrated with the heat sink 2 and the laser medium 3, and made transparent. By integrating a part of the intermediate layer 6 with the heat sink 2 and the laser medium 3, the heat sink 2 and the laser medium 3 are bonded to each other without interposing an adhesive therebetween.

Figure 18B:
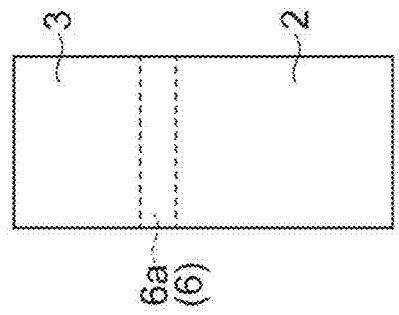
FIG. 18B is a diagram illustrating the continuation of FIG. 18A.
Figure 18A:
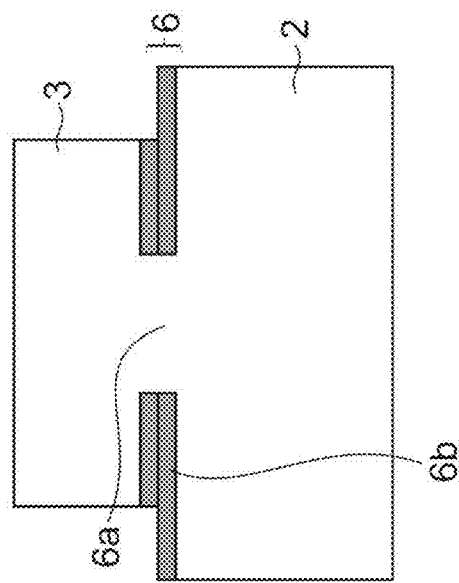
FIG. 18A is a diagram illustrating a method for manufacturing a laser element according to another modification.

In one or more examples, the whole of the intermediate layer may be integrated with at least one of the first element portion and the second element portion, and transparent to laser light. For example, as shown in FIG. 18A, a central portion 6a of the intermediate layer 6 is integrated with the heat sink 2 and the laser medium 3, and made transparent, and an outer edge portion 6b of the intermediate layer 6 remains colored. Thereafter, the heat sink 2, the laser medium 3 and the intermediate layer 6 are cut in such a manner that only the central portion 6a of the intermediate layer 6 remains (the outer edge portion 6b is removed). Accordingly, as shown in FIG. 18B, the colored portion of the intermediate layer 6 is removed, the whole region of the intermediate layer 6 is made transparent, and integrated.

In some examples, a spatial modulation element may be included for controlling a spatial mode of laser light. The spatial modulation element may be bonded to the heat sink 2 and the laser medium 3, and in other examples the spatial modulation element may not be bonded to the heat sink 2 and the laser medium 3.

In one or more examples, the first element portion and the second element portion are bonded to each other at normal temperature via the intermediate layer, but the first element portion and the second element portion may also be bonded to each other by low temperature diffusion bonding in other examples. The first element portion and the second element portion may be directly bonded to each other using these or other bonding methods, and without interposing an adhesive therebetween. In the normal temperature bonding, application of an ion beam or FAB (neutral atomic beam) may be omitted, or the heat sink 2 and the laser medium 3 may not be brought into contact with each other in a substantially evacuated environment.

As discussed herein, laser light is transmitted or reciprocated through the optical element. In some examples, instead of (or in addition to) including an oscillator, the optical element may include an amplifier, a functional material (Q switch element such as Cr:YAG), a wavelength conversion element such as a nonlinear optical material or QPM-quartz, or any combination thereof. Materials to be bonded may include optical switches such as saturable absorbers and nonlinear optical materials for wavelength conversion in addition to combinations including a laser medium and a heat sink. In some examples, the optical element through which laser light is transmitted may not have have a transmittance of 95% or more when the optical element is transparent.

In one invention more examples, the configuration in which the base materials are bonded to each other via the intermediate layer may be modified in arrangement and detail from those described above, and for example, optical elements in the following configuration examples 1 to 4 may be used. The laser medium includes, for example, RE:single crystal/ceramic (YAG, YSGG, YLF, $YVO_4$, SFAP or the like, or any combination thereof), or RE:glass. The Q switch element includes, for example, Cr:YAG The transparent heat sink includes, for example, YAG, sapphire, SiC, diamond, or any combination thereof.

Configuration Example 1

An optical element including a laser medium, a Q switch element laminated on the laser medium, and an intermediate layer therebetween.

Configuration Example 2

An optical element including a transparent heat sink, a laser medium laminated on the heat sink, and an intermediate layer located therebetween.

Configuration Example 3

An optical element including a transparent heat sink, a laser medium laminated on the transparent heat sink, a Q switch element laminated on the laser medium, an intermediate layer located between the transparent heat sink and the laser medium, and an intermediate layer located between the laser medium and the Q switch.

Configuration Example 4

An optical element including a transparent heat sink, a laser medium laminated on the transparent heat sink, a Q switch element laminated on the laser medium, a transparent heat sink laminated on the Q switch, an intermediate layer located between the transparent heat sink and the adjacent laser medium, an intermediate layer located between the laser medium and the Q switch, and an intermediate layer located between the Q switch element and the adjacent transparent heat sink.

In one or more examples, a coating layer may be appropriately provided on each of the members (e.g., the first element portion and the second element portion) that form the optical element. Nd:YAG and Cr:YAG have substantially the same refractive index, and therefore can be directly bonded to each other via an intermediate layer without including an AR (anti reflection) coating as a coating layer. However, for improving excitation efficiency, a HR (high reflection) coating with target wavelengths of 808 nm and 885 nm and an AR coating with a target wavelength of 1064 nm may be provided as coating layers. That is, in one or more examples, a coating is provided, and a base material is bonded to the coating via an intermediate layer. Additionally, in one or more examples, the transparent first element portion and second element portion include an optical switch element such as a Q switch element that is transparent when it is turned on.

In one or more example methods, a fine pattern including a colored portion and a transparent portion is formed in the intermediate layer by performing application of a giant pulse laser light in such a manner that a light wave interferes in the intermediate layer, by performing formation of nanostructures by application of an ultra-short pulse, or by performing patterning of giant pulse laser light by direct rendering or scanning before the first step. In some examples, the first element portion and the second element portion are bonded to each other at normal temperature via the intermediate layer in the first step, and a portion including the colored portion of the fine pattern in the intermediate layer is made transparent in the second step. When the first element portion and the second element portion are bonded to each other at normal temperature, the bonding strength at which the colored portion of the fine pattern of the intermediate layer is interposed between the elements may be different than the bonding strength at which the transparent portion of the fine pattern of the intermediate layer is interposed between the elements. That is, in a bonded region between the first element portion and the second element portion via the transparent intermediate layer, the bonding strength of a portion along the fine pattern is different from the bonding strength of other portions. Accordingly, even though the intermediate layer is ultimately transparent, well bonded regions, and poorly bonded regions such as airgaps (i.e. regions where the transmittance is not increased) are formed in conformity with the fine pattern. The transmittance between the first element portion and the second element portion varies depending on the fine pattern due to such a difference in bonding strength. Therefore, emitted laser light can be modulated using the fine pattern. The polarization of emitted laser light can be controlled. An optical function can be imparted. Any pattern such as an aperture as well as a grating can be designed between the first element portion and the second element portion. In the case of an aperture, mode selection is possible. A mechanical pattern is reflected in optical functions (spectrum control by grating, polarization control, mode control by aperture structure, other optical functions, or any combination thereof).

The combination of the element portions to be bonded may be a suitable combination of any of an optical gain medium, a Q switch element, a heat sink (YAG, sapphire, SiC, diamond, or an opaque material such as Al, Cu or CuW), a nonlinear optical element (nonlinear wavelength conversion (SHG, Raman element or the like), nonlinear optical switch, or the like), a wavelength plate, a polarizer, a beam splitter, a beam coupling element, and the like. The Q switch element includes not only conventional AO (acousto-optic) and EO (electro-optic) but also MO (magneto-optic). In one or more examples, bonding may be performed with a wavelength plate or polarizer disposed in a resonator. In one or more examples, a nonlinear optical wavelength conversion element may be provided, or a beam splitter or a beam coupling element may be provided. In one or more examples, excitation light may be introduced from the heat sink. Bonding of the transparent heat sink is also effective in preventing parasitic oscillation.

In a configuration like that of a disk laser, a metal is used as a heat sink. When the metal is Al or an alloy thereof, or only the outermost surface portion of the heat sink includes Al or the like, a HR coating related to laser light to be emitted is applied to the laser medium, and then the heat sink is bonded by some method. Such a method is also effective in which an alumina layer is deposited on the outside of the HR coating by sputtering or vapor deposition, the HR coating and the alumina layer are then sandwiched between anvils, a giant pulse laser light that transmits through the HR coating, and has a different wavelength is applied thereto, and elements that form the heat sink, and elements that form the laser medium are non-thermally mixed together at a crystal level to bond the heat sink and the laser medium to each other.

According to one or more examples, a loss of emitted laser light may be reduced while providing a small and simple configuration.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

The invention claimed is:

1. An optical element through which laser light is transmitted or reciprocated, the optical element comprising:
    a first element portion transparent to the laser light; and
    a second element portion bonded to the first element portion without interposing an adhesive between the first element portion and the second element portion,
    wherein an intermediate layer is interposed between the first element portion and the second element portion,
    at least a part of the intermediate layer is integrated with at least one of the first element portion and the second element portion by forming a mixed crystal with a constituent element of at least one of the first element portion and the second element portion, or by being substituted for the constituent element, and
    the part of the intermediate layer is transparent to the laser light.

2. The optical element according to claim 1, wherein a bonded portion in at least one of the first element portion and the second element portion is provided with a coating layer, and
    the part of the intermediate layer is integrated with the coating layer.

3. The optical element according to claim 1, wherein the first element portion forms a heat sink,
    the second element portion forms an optical material including laser medium, and
    a plurality of first element portions and a plurality of second element portions are disposed in such a manner that the first element portions and the second element portions are alternately arranged.

4. A method for manufacturing the optical element according to claim 1,
    the method comprising a bonding step of bonding the first element portion and the second element portion, which are transparent to the laser light, to each other without interposing the adhesive between the first element portion and the second element portion, the bonding step including:
        a first step of fixing the first element portion and the second element portion with the intermediate layer disposed between the first element portion and the second element portion, the intermediate layer being colored; and
        a second step of integrating the part of the intermediate layer with at least one of the first element portion and the second element portion, and making the part of the intermediate layer transparent to the laser light by irradiating the intermediate layer with giant pulse laser light and causing the giant pulse laser light to be absorbed into the intermediate layer after the first step.

5. The method for manufacturing according to claim 4, wherein in the first step, the first element portion and the second element portion are bonded to each other at room temperature via the intermediate layer.

6. The method for manufacturing according to claim 4, wherein in the first step, the first element portion and the second element portion are fixed using a fixing tool with the intermediate layer disposed between the first element portion and the second element.

7. The method for manufacturing according to claim 4, wherein the first element portion comprises at least one of diamond, silicon carbide, sapphire, garnet containing YAG, a single crystal of sesquioxide, a ceramic, glass, or an organic material,
    the second element portion comprises at least one of garnet containing YAG, a single crystal of sesquioxide, a ceramic, glass, an organic material, or an optical material including laser gain medium containing sapphire, and
    in the first step, at least one of silicon, aluminum, scandium, lutetium, gadolinium and carbon, which is substituted for the constituent element of the first element portion or the second element portion, is disposed between the first element portion and the second element portion.

8. The method for manufacturing according to claim 4, wherein in the first step, the intermediate layer is formed on at least one of the first element portion and the second element portion by sputtering or vapor deposition.

9. The method for manufacturing according to claim 4, wherein in the first step, the intermediate layer having a sheet shape is sandwiched between the first element portion and the second element portion.

10. The method for manufacturing according to claim 4, wherein a bonded portion in at least one of the first element portion and the second element portion is provided with a coating layer, and in the second step, the part of the intermediate layer is integrated with the coating layer.

11. The method for manufacturing according to claim 4, wherein in the second step, a fine pattern including a colored portion and a transparent portion is formed in the intermediate layer by applying the giant pulse laser light in such a manner that a light wave interferes in the intermediate layer, or by patterning the giant pulse laser light by direct rendering or scanning.

12. The method for manufacturing according to claim 4, wherein in the second step, the part of the intermediate layer is made transparent, and another part of the intermediate layer remains colored.

13. The method of manufacturing according to claim 4, wherein the first element portion forms a heat sink,
    the second element portion forms an optical material including laser medium, and
    in the first step, a plurality of first element portions and a plurality of second element portions are disposed in such a manner that the first element portions and the second element portions are alternately arranged.

14. The method for manufacturing according to claim 4, wherein before the first step, a fine pattern including a colored portion and a transparent portion is formed in the intermediate layer by applying the giant pulse laser light in such a manner that a light wave interferes in the intermediate layer, by forming nanostructures by application of an ultrashort pulse, or by patterning the giant pulse laser light by direct rendering or scanning,
- the first element portion and the second element portion are bonded to each other at ambient temperature via the intermediate layer in the first step, and
- a portion including the colored portion of the fine pattern in the intermediate layer is made transparent in the second step.

15. An optical element through which laser light is transmitted or reciprocated, the optical element comprising:
- a first element portion transparent to the laser light; and
- a second element portion bonded to the first element portion without interposing an adhesive between the first element portion and the second element portion,
- wherein an intermediate layer is interposed between the first element portion and the second element portion,
- at least a part of the intermediate layer is integrated with at least one of the first element portion and the second element portion, and is transparent to the laser light,
- a bonded portion in at least one of the first element portion and the second element portion is provided with a coating layer, and
- the part of the intermediate layer is integrated with the coating layer.

16. The optical element according to claim 15, wherein the part of the intermediate layer is at least one of a compound containing a constituent element of a bonded portion of the first element portion and a compound containing a constituent element of a bonded portion of the second element portion.

17. The optical element according to claim 15, wherein a fine pattern including a colored portion and a transparent portion transparent to the laser light is formed in the intermediate layer.

18. The optical element according to claim 15,
- wherein the part of the intermediate layer is transparent to the laser light, and another part of the intermediate layer is colored.

19. The optical element according to claim 15,
- wherein the first element portion forms a heat sink,
- the second element portion forms an optical material including laser medium, and
- a plurality of first element portions and a plurality of second element portions are disposed in such a manner that the first element portions and the second element portions are alternately arranged.

20. The optical element according to claim 15, wherein in a bonded region between the first element portion and the second element portion via the transparent intermediate layer, a bonding strength of a portion along a fine pattern formed in the intermediate layer is different from a bonding strength of other portions.

* * * * *